US012747596B2

(12) United States Patent
Josefsson et al.

(10) Patent No.: US 12,747,596 B2
(45) Date of Patent: Sep. 29, 2026

(54) METHOD AND SYSTEM FOR ATTACHING AN UNDERLAY ELEMENT TO A BOARD ELEMENT AND AN ASSOCIATED BOARD ELEMENT

(71) Applicant: Ceraloc Innovation AB, Viken (SE)

(72) Inventors: Per Josefsson, Ramlösa (SE); Christoffer Nilsson, Viken (SE); Niclas Hakansson, Viken (SE)

(73) Assignee: CERALOC INNOVATION AB, Viken (SE)

( * ) Notice: Subject to any disclaimer, the term of this patent is extended or adjusted under 35 U.S.C. 154(b) by 942 days.

(21) Appl. No.: 17/061,881

(22) Filed: Oct. 2, 2020

(65) Prior Publication Data

US 2021/0102383 A1 Apr. 8, 2021

(30) Foreign Application Priority Data

Oct. 4, 2019 (SE) .................................... 1951134-4

(51) Int. Cl.
*E04F 15/02* (2006.01)
*B32B 37/00* (2006.01)
(Continued)

(52) U.S. Cl.
CPC ...... *E04F 15/0215* (2013.01); *B32B 37/0076* (2013.01); *B32B 37/1292* (2013.01);
(Continued)

(58) Field of Classification Search
CPC . E04F 15/0215; E04F 13/0885; E04F 15/206; B32B 37/0076; B32B 37/1292;
(Continued)

(56) References Cited

U.S. PATENT DOCUMENTS 9,109,108 B1 8/2015 Ford et al.
2005/0223664 A1 10/2005 Gardner
(Continued)

FOREIGN PATENT DOCUMENTS

DE 102006007555 A1 * 8/2007 ......... B05C 11/1021
JP 09144276 A * 6/1997
(Continued)

OTHER PUBLICATIONS

Office Action and accompanying search report issued in Swedish Patent Application No. 1951134-4, Mar. 30, 2020, Swedish Patent and Registration Office, 10 pages.
(Continued)

*Primary Examiner* — S. Behrooz Ghorishi
(74) *Attorney, Agent, or Firm* — Boone IP Law

(57) ABSTRACT

A method for attaching an underlay element to a weight-reduced board element. The method includes providing a board element and an underlay element, wherein a rear side of the board element includes a groove portion and a remaining portion. The groove portion includes at least one groove. An adhesive is applied on at least a portion of the remaining portion and/or on at least a portion of a corresponding residual portion of the underlay element, and the underlay element is arranged on the rear side of the board element, such that the adhesive contacts the underlay element and the rear side.

20 Claims, 10 Drawing Sheets

(51) Int. Cl.

| | |
|---|---|
| ***B32B 37/12*** | (2006.01) |
| ***B32B 38/00*** | (2006.01) |
| ***E04F 13/08*** | (2006.01) |

(52) U.S. Cl.
CPC ...... *B32B 38/0004* (2013.01); *B32B 2309/72* (2013.01); *B32B 2607/00* (2013.01); *E04F 13/0885* (2013.01)

(58) Field of Classification Search
CPC ............ B32B 38/0004; B32B 2309/72; B32B 2607/00; B32B 3/30; B32B 2260/026; B32B 2262/067; B32B 2264/067; B32B 2264/104; B32B 3/06; B32B 3/14; B32B 3/266; B32B 5/028; B32B 7/02; B32B 9/02; B32B 9/042; B32B 27/302; B32B 2266/025; B32B 5/18; B32B 27/36; B32B 2250/02; B32B 2419/00; B32B 7/06; B32B 13/045; B32B 2260/046; B32B 2262/101; B32B 2264/10; B32B 2266/0207; B32B 2266/0221; B32B 2266/0228; B32B 2266/0264; B32B 2266/06; B32B 2266/08; B32B 2307/538; B32B 2307/546; B32B 2307/7246; B32B 2307/748; B32B 2479/00; B32B 7/14; B32B 9/045; B32B 13/04; B32B 19/04; B32B 19/047; B32B 21/02; B32B 21/042; B32B 21/14; B32B 27/08; B32B 27/12; B32B 27/20; B32B 27/22; B32B 27/304; B32B 27/32; B32B 37/22; B32B 2266/0278; B32B 2307/732; B32B 2419/04; B32B 7/12

See application file for complete search history.

(56) References Cited

U.S. PATENT DOCUMENTS

| | | | | |
|---|---|---|---|---|
| 2012/0266555 | A1 | 10/2012 | Cappelle | |
| 2012/0291387 | A1 | 11/2012 | Keane | |
| 2013/0047536 | A1 | 2/2013 | Pervan | |
| 2013/0067842 | A1 | 3/2013 | Meersseman et al. | |
| 2014/0000197 | A1 | 1/2014 | Pervan | |
| 2014/0202626 | A1 | 7/2014 | Sennik | |
| 2018/0044922 | A1 | 2/2018 | Cole et al. | |
| 2018/0283014 | A1 | 10/2018 | Hodgkins et al. | |
| 2019/0024390 | A1 | 1/2019 | Yasuda et al. | |
| 2019/0168410 | A1* | 6/2019 | Conboy | B27K 3/0228 |
| 2020/0039182 | A1* | 2/2020 | Uemura | B05D 7/00 |
| 2024/0001415 | A1* | 1/2024 | Connell | B29C 43/52 |

FOREIGN PATENT DOCUMENTS

| | | | | |
|---|---|---|---|---|
| JP | H09-144276 A | 6/1997 | | |
| JP | H09-144277 A | 6/1997 | | |
| JP | H10-299231 A | 11/1998 | | |
| JP | H11-324292 A | 11/1999 | | |
| JP | 3047366 B2 | 3/2000 | | |
| JP | 2004-167762 A | 6/2004 | | |
| WO | WO 2011/077311 A2 | 6/2011 | | |
| WO | WO 2011/141849 A2 | 11/2011 | | |
| WO | WO-2014007738 A1 * | 1/2014 | | B27M 3/04 |
| WO | WO 2014/139294 A1 | 9/2014 | | |
| WO | WO 2018/187329 A1 | 10/2018 | | |

OTHER PUBLICATIONS

International Search Report and Written Opinion mailed Dec. 8, 2020 in PCT/SE2020/050931, ISA/SE, Stockholm, SE, 12 pages.

Josefsson, Per, et al., U.S. Appl. No. 17/645,082 entitled “Underlay Element for Flooring and Floor Assembly,” filed Dec. 20, 2021.

Supplementary European Search Report and Search Opinion received for European Application No. 20871983, mailed on Sep. 27, 2023, 7 pages.

* cited by examiner

METHOD AND SYSTEM FOR ATTACHING AN UNDERLAY ELEMENT TO A BOARD ELEMENT AND AN ASSOCIATED BOARD ELEMENT

CROSS REFERENCE TO RELATED APPLICATIONS

The present application claims the benefit of Swedish Application No. 1951134-4, filed on Oct. 4, 2019. The entire contents of Swedish Application No. 1951134-4 are hereby incorporated herein by reference in their entirety.

TECHNICAL FIELD

The disclosure generally relates to an underlay element of a board element, such as a panel. More specifically, the disclosure relates to a method and a system for applying an underlay element to a board element, such as a panel, wherein a rear side of the board element comprises at least one groove. The disclosure also relates to the board element itself, such as a panel. The panel may be a building panel, floor panel, wall panel, ceiling panel or furniture panel. Generally, the panel, such as a floor panel, may comprise thermoplastic material or a thermoset. The floor panel may be a Luxury Vinyl Tile (LVT tile), a Stone Plastic (Polymer) Composite panel (SPC panel), an Expanded Polymer Core (EPC panel), or a Wood Plastic Composite panel (WPC panel). Alternatively, the panel may comprise an HDF core and, optionally, at least one wood-fibre based layer. In some embodiments, the panel may be a mineral-based panel, such as a cementitious panel or such as comprising magnesium oxide and, optionally, magnesium chloride and/or magnesium sulphate.

BACKGROUND

It is well-known that an underlayment may be provided under panels, such as floor panels, for improving some of their properties. For example, the sound properties, feeling, resiliency, thermal properties, permeable properties and energy absorption of the panels may be influenced.

The underlayment may be provided loosely on a substructure, such as a subfloor, on which the panels are installed, but it may also be glued to the panels and/or to the substructure.

The U.S. Pat. No. 9,109,108 B1 discloses a method of installing a floor on a floor substrate, in which a first adhesive layer is applied to the floor substrate. A certain hybrid underlayment including an extruded thermoplastic sheet having a plurality of gas-filled expanded thermoplastic microspheres distributed therein is placed on the first adhesive layer. A second adhesive layer is applied to the hybrid underlayment and then a plurality of interfacing LVT flooring units is placed on the second adhesive layer.

The disclosure US 2012/0291387 A1 discloses a flooring system comprising a top floor layer, a sub floor, and/or an underlayment material disposed between the subfloor and the top floor layer. The top floor layer may include a plurality of luxury vinyl tiles, configured such that respective tile joints may be formed between adjacent luxury vinyl tiles. The underlayment material may comprise a crosslinked, polyolefin foam.

Recently, there has been an increased interest in panels having reduced weights. One way of obtaining a reduced weight is to remove material from a rear side of the panels. WO 2013/032391 discloses floor panels comprising plastic core layer(s), such as LVT floor panels, comprising flexing grooves for increasing their flexibility as well as for decreasing their weight. Moreover, WO 2014/007738 discloses building panels, such as floor panels, comprising thermosetting resins or a thermoplastic material, preferably comprising a filler, and being provided with core grooves.

WO 2013/032391 generally describes that an underlay, for example a foam, may cover the flexing grooves. Furthermore, WO 2014/007738 describes that a separate covering layer, for example a paper, plastic foil, foam, cork or wood veneer, may cover the core grooves for providing a moisture sealing or to reduce sound. However, there are still room for improvements, especially with regards to methods for providing underlayments on the panels.

SUMMARY

It is therefore an object of at least embodiments of the present inventive concept to provide a method for attaching an underlay element, such as an underlay unit, to a weight-reduced and/or a flexible board element, such as a panel, which may require less amount of adhesive.

It is also an object of at least embodiments of the present inventive concept to provide such a method which is more cost effective.

It is a further object of at least embodiments of the present inventive concept to provide a corresponding system.

Additionally, it is an object of at least embodiments of the present inventive concept to provide a corresponding board element, such as a panel, wherein an underlay element, such as an underlay unit, is attached thereto.

At least some of these and other objects and advantages that will be apparent from the description have been achieved by the various aspects described below.

In accordance with a first aspect of the inventive concept, there is provided a method for attaching an underlay element, such as an underlay unit, to a board element, such as a panel. The method comprises: providing a board element, wherein a rear side of the board element comprises a groove portion and a remaining portion, the groove portion comprising at least one groove, providing the underlay element, applying an adhesive on at least a portion of the remaining portion and/or on at least a portion of a corresponding residual portion of the underlay element, and arranging the underlay element on the rear side of the board element, such that the adhesive contacts the underlay element and the rear side.

The method may comprise, in order, providing a board element and/or an underlay element, applying an adhesive, and arranging the underlay element on the rear side. Generally, the adhesive may adhere or attach the underlay element to the rear side.

The groove(s) may reduce the weight of the board element. By means of the groove portion, a surface area of the rear side becomes smaller. Thereby, a contact area between the rear side and the underlay element may decrease. Hence, by selectively applying the adhesive in accordance with the first aspect, and embodiments thereof, a smaller amount of adhesive may be needed for attaching the underlay element to the board element.

The adhesive may be applied only, or essentially only, such as 95% of the surface area, on the remaining portion and/or the residual portion. Thereby, application of adhesive in the groove portion may be avoided. The groove portion may be free from adhesive.

The board element may be a panel per se, such as a floor panel, or it may be dividable into at least one panel, such as at least two panels, e.g., floor panels. The panels may be essentially similar. It is emphasized that throughout this disclosure, any embodiment involving a board element may also be an embodiment involving a panel per se. It is noted, however, that the panel may comprise, or may be intended to comprise, a locking system for horizontal and/or vertical locking, preferably a mechanical locking system. The locking system of the panel may be pre-formed before applying the adhesive and attaching the underlay element to the panel or it may be post-formed after attaching the underlay element to the panel.

A mechanical vertical locking system may comprise a tongue and a tongue groove configured to cooperate with a tongue groove and a tongue, respectively, provided on an adjacent panel. In a first example, the tongue is integrally formed with the panel. In a second example, the tongue is separately formed from the panel. The separately formed tongue may be a displaceable tongue, preferably being flexible, provided in an insertion groove. A mechanical horizontal locking system may comprise a locking element provided on a locking strip and a locking groove configured to cooperate with a locking groove and a locking element provided on a locking strip, respectively, provided on an adjacent panel.

The board element may extend in a first (X) and a second (Y) horizontal direction, which may be perpendicular to each other. In a first example, the first and second horizontal directions extend in parallel with long edge portions and short edge portions of the board element, respectively. In a second example, the first and second horizontal directions extend in parallel with short edge portions and long edge portions of the board element, respectively. A vertical direction (Z) of the board element may be perpendicular to the first and second horizontal directions. A thickness of the board element may be an extension of the board element along the vertical direction.

The at least one groove may have a longitudinal extension and a transverse extension. The longitudinal extension may be larger than the transverse extension. The longitudinal extension may be parallel to the first horizontal direction.

The at least one groove of a panel may be provided in an interior of the rear side being spaced from a pair of opposite edge portions, such as opposite short edge portions, of the panel, preferably being spaced from all edge portions of the panel.

Likewise, the underlay element may extend in a first and a second horizontal direction, which may be perpendicular to each other. The first and a second horizontal direction of the underlay element may be parallel to the first and a second horizontal direction of the board element, respectively.

The board element may further comprise a front side arranged on an opposing side with respect to the rear side. The front side may adapted to be visible and, at least in some embodiments, the rear side may be adapted to be concealed in an installed state of the board element or panel. Generally, the panel may be a building panel, floor panel, wall panel, ceiling panel or furniture panel.

The board element or panel may comprise a pair of opposite edge portions. The board element or panel may comprise a first pair and a second pair of opposite edge portions, for example comprising long edge portions and short edge portions of the board element/panel, respectively. The locking system for horizontal and/or vertical locking, preferably a mechanical locking system, may be provided on long edge portions and/or on short edge portions of the panel.

Generally, the board element or panel, such as a floor panel, may comprise thermoplastic material or a thermoset. In a first example, the panel, such as a floor panel, may be an LVT tile, an SPC panel, an EPC panel, or an WPC panel. In a second example, the panel may comprise a core, such as an HDF core and, optionally, at least one wood-fibre based layer attached to the core. The at least one wood-fibre based layer may comprise a powder mix comprising a wood powder or wood fibres. Moreover, the wood-fibre based layer may comprise a thermoset resin, such as a melamine-formaldehyde resin or urea-formaldehyde resin, and, optionally, pigments. The thermoset resin and/or pigments may be provided in the powder mix. Optionally, a wood covering, such as a veneer may be provided on the least one wood-fibre based layer. A floor panel may be a Nadura® panel or a Woodura® panel.

In some embodiments, the panel may be a mineral-based panel, such as a cementitious panel or such as comprising magnesium oxide and, optionally, magnesium chloride and/or magnesium sulphate. For example, panel may be, or may comprise, a magnesium oxide (MgO) panel, cement board or fibre cement board. In particular, the rear side may comprise any of the materials above.

By means of the underlay element being attached to the rear side, at least some grooves, preferably all grooves, may be concealed.

The groove portion may be integrally formed with the board element. Thereby, material composition of the rear side and of at least portions of the groove portion may be substantially similar.

Generally, the groove portion may be formed by removing material from the rear side. Alternatively, the groove portion may be formed when the board element or panel is formed, such as by heat and pressure.

The remaining portion may be provided in a horizontal plane extending along the rear side of the board element. Thereby an increased adherence between the rear side and the underlay element may be provided. In a first example, the remaining portion is smooth. In a second example, the remaining portion comprises a surface roughness, e.g. comprising peaks and valleys, the peaks preferably extending vertically from the valleys by less than 0.5 mm, such as less than 0.35 mm. For example, the adhesive may be provided on the peaks, preferably such that no, or substantially no, adhesive is applied in the valleys.

Throughout the disclosure, it is understood that every embodiment and example etc. discussed in relation to a board element in the first, second, third, fourth and fifth aspects, is equally applicable to a panel.

In some embodiments, the panel, such as a furniture panel or a building panel, may be configured to be a component in a panel arrangement, such as a furniture arrangement. In some embodiments, the panel, such as a building panel, floor panel, wall panel or ceiling panel, may be configured to be installed on and/or connected to a substructure, such as a grid of profiles or a subfloor.

The panel, when provided as a floor panel, with the underlay element attached thereto, may be configured to be installed on a subfloor in a floating manner. Thereby, there may be no need to apply an attaching member, such as an adhesive, to an underside of the underlay element.

The panel, such as a floor panel, may be configured to be attached to the substructure, such as a subfloor, for example by an adhesive. In some embodiments, the panel may be configured to be installed loosely on the substructure, such as a subfloor, without any locking system interlocking the panels.

In some embodiments, the adhesive may be applied on substantially the entire remaining portion and/or substantially the entire corresponding residual portion.

The adhesive may be applied on an upper side of the underlay element. Thereby, the upper side may be attached to the rear side. The adhesive may contact at least a portion of the underlay element and may be provided between the underlay element and the rear side.

The corresponding residual portion may be configured to face and to be aligned with the remaining portion of the rear side when the underlay element is attached to the rear side. The underlay element may further comprise a cover portion configured to face and to be aligned with the groove portion when the underlay element is attached to the rear side. The cover portion may cover the groove portion. Preferably, no adhesive is applied in the cover portion. The corresponding residual portion and the cover portion may be a respective surface portion of the upper side.

The adhesive may be any known adhesive, such as glue, known in the art which preferably is compatible with the materials of the board element, such as the material of the rear side, and the underlay element, such as the material of its upper side.

The method may further comprise curing or hardening the adhesive.

The adhesive may be applied by an adhesive applicator.

The adhesive may be applied during a displacement of the board element and/or the underlay element along a feeding path. Thereby, the method may become more time efficient. Moreover, the method may be implemented in a continuous process. The adhesive may be applied in-line.

The arranging of the underlay element on the rear side may be performed during a displacement of the board element and/or the underlay element in a feeding path.

The application of the adhesive and/or the arrangement of underlay element on the rear side may be carried out in a continuous process, such as during feeding of the underlay element and/or the board element in a continuous process, for example by utilizing rollers. For example, the continuous process may be suitable when the underlay element comprises a resilient material, such as a foam, but may also be used when the underlay element, preferably in the form of at least one underlay unit, is configured to be delivered individually.

In some embodiments, the application of the adhesive and/or the arrangement of the underlay element on the rear side may be carried out in a discontinuous process. For example, the discontinuous process may be suitable when the underlay element, preferably in the form of at least one underlay unit, may be delivered individually, such as in the form of at least one cork sheet.

The adhesive may be applied at least on a peripheral portion of the rear side and/or on a peripheral portion of an upper side of the underlay element, any or both of the peripheral portions preferably extending along a short edge portion and/or a long edge portion of the board element (or panel) and/or the underlay element (or underlay unit). The peripheral portion may be provided in the remaining portion and/or in the corresponding residual portion. The peripheral portion of the rear side and of the upper side may be located in a horizontally outer portion of the rear side and of the upper side, respectively, preferably close to an edge portion, such as a short or a long edge portion, thereof. The peripheral portion may be located within a distance of 10%, preferably 5%, of a total length of the board element or underlay element from a horizontally outermost portion of the rear side or the upper side. Alternatively, or additionally, the peripheral portion may be located within a distance of 20 mm, preferably 10 mm, from the horizontally outermost portion.

The peripheral portion of a board element may comprise a peripheral portion of at least one panel, such as at least two panels, into which the board element is configured to be divided. Alternatively, or additionally, the peripheral portion of an underlay element may comprise a peripheral portion of at least one underlay unit, such as two underlay units, into which the underlay element is configured to be cut. The peripheral portion of the at least one panel and/or underlay unit may extend along a short edge portion and/or a long edge portion of the panels/underlay units.

As further elaborated on below, the applying of the adhesive may be controlled such that no, or substantially no, adhesive is applied in the at least one cutting portion and/or the at least one dividing portion. Optionally, the applying of the adhesive may be controlled such that no, or substantially no, adhesive is applied in a rear-side portion where a locking system, such as of at least one panel, is configured to be formed. Yet optionally, the applying of the adhesive may be controlled such that no, or substantially no, adhesive is applied in an upper-side portion of the at least one underlay unit configured to contact a portion of the at least one panel where the locking system is configured to be formed. Hence, the need for applying adhesive in some portions may become redundant since they are intendent to be processed, such as divided, cut or processed for forming a locking system. Thereby, the amount of adhesive used may be further reduced.

The peripheral portion may extend continuously around the periphery of the rear side and/or the upper side, such as along a short edge portion and/or a long edge portion of the board element and/or the underlay element. For example, the groove portion may be separated from the peripheral portion of the rear side and/or the cover portion may be separated from the peripheral portion of the upper side.

Alternatively, or additionally, to applying adhesive on the peripheral portion, the adhesive may be applied on the remaining portion in an interior of the rear side, such as inside of the peripheral portion. For example, the adhesive may be applied inwardly of a pair of outermost grooves extending, preferably longitudinally, along the first horizontal direction, such as along the long edge portions of the panel.

The method may further comprise controlling the applying of the adhesive based on a characteristic of the at least one groove. Thereby, the adhesive may be selectively applied in desired areas, such as on the remaining portion and/or the corresponding residual portion. The characteristic may be a shape of the at least one groove and/or an extension of the at least one groove in a first and/or a second horizontal direction of the board element. Alternatively, or additionally, the characteristic may be a position of the at least one groove in the rear side and/or a distance between at least one pair of grooves in the first and/or the second horizontal direction or a distance between at least one pair of groove arrangements in the first and/or the second horizontal direction, each groove arrangement comprising at least one groove, preferably a plurality of grooves.

The application may be controlled by a control unit. The controlling may comprise controlling a positioning of the adhesive on the board element and/or the underlay element and, optionally, an amount of the adhesive. By varying the amount applied, a thickness and/or a width of the adhesive may be varied, such as along an application direction of the adhesive. The application direction may be parallel with the feeding direction of the board element and/or underlay element.

The controlling may be based on data about the characteristics of the at least one groove. In some embodiments, data about the characteristics may be retrieved by the control unit from a data storage unit, where the data may be stored. In some embodiments, the data may be collected by a data collecting unit, during operation of a system implementing the method disclosed herein, or before said operation. For example, the data may be obtained by scanning the rear side by a scanner. In some embodiments, the data about the characteristics may be predetermined. For example, data about the shape, the extension, any of the positions, etc. may be predetermined. In some embodiments, collected and predetermined data may be combined. In yet some embodiments, the data about the characteristics may determine a position of an adhesive applier, such as a roll coater or a slot-die coater, with respect to the board element and/or the underlay element during application of the adhesive. For example, and as outlined above, the data may be predetermined data and/or collected data.

Generally, the method may comprise retrieving data about the characteristics of the at least one groove for controlling the applying of the adhesive.

A position of the underlay element may have to be controlled, such as synchronized, with a position of the board element, such that the underlay element may become aligned with the board element. In a first example, the cover portion may be aligned with the groove portion and the corresponding residual portion may be aligned with the remaining portion. Preferably, no adhesive is applied in the cover portion. The synchronization may be particularly important in embodiments in which adhesive has been applied on the underlay element. In a second example, horizontally outermost portions of the underlay element and of the rear side may be aligned, e.g. as described elsewhere herein. The first and second examples may be combined. The synchronization may be controlled by the control unit.

The adhesive may be applied by contact application, such as by slot-die coating or by roller coating. The roller coating and slot-die coating may be applied by a roll coater and a slot-die coater, respectively. By the contact method, the amount of applied adhesive may be more precisely controlled. An advantage of roller coating is that the adhesive may be applied mainly in the remaining portion. An advantage of slot-die coating is that the adhesive may be applied more evenly. In some embodiments, when a surface structure of the rear side is too rough, it may be preferred to utilize slot-die coating on the underlay element.

Throughout the disclosure, the board element and/or the underlay element may generally be referred to as a substrate. Thus, the adhesive may be applied on the substrate, such as on the board element and/or the underlay element.

The adhesive may be applied on a substrate by slot-die coating from any direction. For example, the adhesive may be applied from above or from below when the substrate is provided in an inclined, vertical or horizontal position or is fed in an inclined, vertical or horizontal direction.

The slot-die coating or roller coating may be used when the substrate is continuously fed, for example by rollers, such as when the substrate, for example board element and/or an underlay element, is flexible and/or soft.

Roller coating may apply the adhesive in a broad application as detailed below.

The adhesive may be applied by non-contact application, such as by spraying or curtain coating. The spray coating and curtain coating may be applied by a spray coater and a curtain coater, respectively. By the non-contact method, the adhesive may be applied at a distance from the substrate. Thereby, accumulation of dirt in the adhesive applicator may be decreased or even avoided.

The adhesive may be applied continuously or intermittently, such as along a feeding path of the board element and/or the underlay element. The continuous or intermittent application may result in adhesive extending continuously or discontinuously, respectively, along at least a portion of the board element and/or the underlay element along the first or second horizontal direction, such as along the entire board element. By means of the intermittent application, even less adhesive may be needed. The continuous or intermittent application may be controlled in accordance with any embodiment of controlling described herein.

Intermittent application is conceivable in any contact application or non-contact application described herein. In a first example, the intermittent application may be implemented by bringing the roll coater in and out of contact with the board element and/or the underlay element while displacing the same along a feeding path. In a second example, the intermittent application may be implemented by transfer application, such as by utilizing a combination of a transfer roller and an adhesive unit, e.g. a slot-die and a roll coater. In a third example, the intermittent application may be implemented by an intermittent non-contact application, such as by spraying or curtain coating, while displacing the board element and/or the underlay element along a feeding path.

The adhesive may be applied in a line application or in a broad application. The line application may apply the adhesive along the first and/or the second horizontal direction of the board element and/or the underlay element. Moreover, the line application may apply the adhesive over at least one portion of a width of the rear side or of the upper side, such as between respective short or long edge portions thereof. For example, the line application may cover less than 20%, such as less than 10% or less than 5%, of the width. The broad application may apply the adhesive over substantially the entire width of the rear side and/or upper side, such as between short and/or long edge portions thereof. Clearly, as in any embodiment disclosed herein, the adhesive is preferably only applied on the remaining portion and/or the corresponding residual portion.

Line application may be attained by e.g. spraying or slot-die coating or roller coating. Broad application may be attained by e.g. roller coating, spraying, slot-die coating or curtain coating.

Any of the continuous application or intermittent application may be a line application or a broad application. Moreover, the continuous application may extend between a pair of edges of the board element and/or underlay element, which may be transported along the respective feeding path.

A continuous broad application may completely cover the remaining portion with adhesive, such as by using roller coating. A continuous or intermittent line application or an intermittent broad application may partially cover the remaining portion with adhesive.

Generally, the adhesive may be applied, such as controlled to be applied, only in dedicated areas. Thereby, the amount of adhesive used may be further reduced. The adhesive may be applied in a pattern arrangement, such as on the remaining portion and/or on the corresponding residual portion. For example, the pattern arrangement may be obtained by a continuous or intermittent application of the adhesive, or even a combination thereof.

The pattern arrangement may be a primary pattern. The primary pattern may comprise a repeating occurrence of the same basic application design. For example, the basic application design may be provided in the form of a grid or it may be shaped as a circle, an oval or a polygon, such as a triangle, a square or a star, etc.

Optionally, the pattern arrangement may further comprise at least one further pattern, such as a secondary pattern. The secondary pattern may comprise at least two primary patterns. In a first example, the at least two primary patterns may be spaced from each other. In a second example, the at least two primary patterns may be juxtaposed or intertwined.

The pattern arrangement may be a predetermined pattern arrangement. In a first example, the pattern arrangement may be applied by controlling the spraying of the adhesive, such as applying in pulses and/or in patterns, e.g. in swirl patterns. In a second example, the pattern arrangement may be applied by an engraved roll coater. For example, the applied adhesive may be provided as an embossing or as a texture. A surface of the engraved roll coater may comprise a plurality of structural elements, such as indentations and/or protrusions. The structural elements, such as their position on the roll coater and/or their shape, may correspond to the pattern arrangement, for example the embossing or texture, including its basic application design. In a third example, the pattern arrangement may be applied by a slot-die coater operating intermittently and/or by line application. In a fourth example, the pattern arrangement may be applied by a slot-die coater in conjunction with at least one mask.

The adhesive may be applied on the board element and/or the underlay element by transfer application, such as by utilizing a transfer roller and an adhesive unit configured to distribute adhesive on the transfer roller. For example, the adhesive unit may be a slot-die coater. Thereby, a more flexible application operation of the adhesive may be obtained, for example while keeping the benefits of roller coating. Also, there may be no need for an engraved roller for obtaining a pattern arrangement. Additionally, it may be easier to control the application of the adhesive. For example, a pattern arrangement and/or an intermittent application of the adhesive may easily be varied by varying the distribution of the adhesive from the adhesive unit on the transfer roller.

The remaining portion may have a larger thickness than a thickness of the groove portion, a main portion of the remaining portion preferably having a constant thickness. The thickness may be a distance, such as a maximal thickness, between the front side and the rear side in the remaining portion and/or groove portion. The main portion may be at least 50%, such as at least 70% or at least 90%, of an area of the rear side. In some embodiments, substantially the entire, or the entire, remaining portion may have a constant thickness.

At least two grooves may have been discontinuously formed. The applying of the adhesive may comprise applying the adhesive between the discontinuous grooves, such as along a first and/or a second horizontal direction of the board element. It is clear that alternatively, or additionally, the applying of the adhesive may comprise applying the adhesive between corresponding cover portions of the underlay element, such as along a first and/or a second horizontal direction of the underlay element.

The discontinuous grooves may be spaced from each other in a first and/or a second horizontal direction of the board element.

A longitudinal extension of the discontinuous grooves may be parallel with long edge portions of the board element.

The groove portion may comprise at least two groove arrangements, each groove arrangement comprising at least two grooves, such as a plurality of grooves. Preferably, the grooves are discontinuous grooves of the board element. The groove arrangements may be spaced by a separation portion, preferably extending continuously along the second horizontal direction, such as between the long edge portions of the board element. For example, the separation portion may comprise a rectangularly shaped portion. By means of the separation portion, a more stable board element may be provided.

In some embodiments, a longitudinal extension of the grooves, such as discontinuous grooves, may be parallel with short edge portions of the board element.

The board element may comprise at least one layer and the at least one groove may at least partly penetrate the at least one layer, such as at least a bottom layer. The at least one layer may comprise a top layer. Moreover, in some embodiments the bottom layer may be a backing layer. The backing layer may be a balancing layer. The rear side may be provided in a bottom layer of the at least one layer, such as in a backing layer. Generally herein, at least two layers of the board element may be laminated together, such as by heat and pressure, or bonded together by an adhesive.

The board element may comprise at least two layers, and at least one reinforcing layer, such as glass-fibre layer, for example being provided as a mesh, may be provided between at least two of the layers.

The at least one groove may completely penetrate the bottom layer, such as the backing layer.

The at least one layer, optionally comprising a top layer and/or a bottom layer, such as a backing layer, may each comprise a polymer-based material, preferably a thermoplastic material or a thermoset. Preferably, the least one layer, optionally comprising the top and/or bottom layer each comprises a filler.

An underlay unit may be arranged on or attached to the rear side of the board element or panel. The board element or panel and underlay unit may have formats, such as areas and/or shapes, that are adapted to each other. An area and/or a shape of each underlay unit may correspond to an area and/or a shape of the rear side of the board element or panel, for example being essentially the same. The shape may be rectangular or quadratic. In a first example, the area and/or shape of the underlay unit corresponds to the area and/or shape of the rear side before attaching the underlay unit on the rear side. In a second example, an underlay element is attached on the rear side and is thereafter cut into an underlay unit such that its area and/or shape corresponds to the area and/or shape of the rear side.

The underlay element may be at least one underlay unit per se. For example, the at least one underlay unit may be stored in an underlay applier, which may be configured to arrange the at least one underlay unit on the rear side.

The underlay element may be cuttable into at least one underlay unit. The method may further comprise cutting the underlay element into at least one underlay unit along at least one cutting portion. For example, the underlay element may be stored on a roll and may delivered therefrom to an underlay applier.

The underlay element may be cut when the underlay element is attached to the board element. In some embodiments, the method may comprise cutting the underlay element only, without, or substantially without, processing, such as at least partly dividing, the board element. The board element may be divided after the cutting. Thereby, a simple separation of the removed material elements may be provided, e.g. if they are to be recycled. In some embodiments, the method may comprise cutting the underlay element as well as dividing the board element, such as the cutting and dividing being performed in the same operation. Thereby, an efficient processing may be provided. However, the removed material elements may have to be separated, e.g. if they are to be recycled.

The underlay element may be cut before the underlay element is attached to the board element, such as before the underlay element is arranged on the board element.

In some embodiments, horizontally outermost portions of the underlay element, preferably an upper side thereof, and of the rear side may be aligned, such as along their first and/or second horizontal directions. Thereby, a tighter fit between the underlay elements of adjacent installed panels may be obtained, e.g. improving their sealing effect against moisture etc. For example, an extension of the underlay element in the first and/or second horizontal direction may be the same, or essentially the same, as an extension of the panel in the first and/or second horizontal direction.

In some embodiments, the underlay element provided on the rear side may comprise at least one chamfer. The chamfer may be pre-formed or it may be formed after the underlay element has been arranged on the rear side.

It is emphasized yet again that throughout this disclosure it is understood that, when referring to an underlay element, it may be an at least one underlay unit per se or it may be cuttable into at least one underlay unit.

The underlay element may be cut by a cutting tool, such as a rotating cutting device, a carving device or a knife arrangement. In some embodiments, each cutting portion may correspond to a width of the cutting tool.

The method may further comprise dividing the board element into at least one panel, such as at least two panels, along at least one dividing portion. The board element may be divided by a dividing tool, for example comprising rotating cutting elements, such as a circular saw blade. In some embodiments, each dividing portion may correspond to a width of the dividing tool.

Each dividing portion may be provided along the first or the second horizontal direction of the board element. In a first example, each dividing portion may be provided in parallel with long edge portions of the board element. In a second example, each dividing portion may be provided in parallel with short edge portions of the board element.

The board element may be divided after the act of arranging the underlay element on the rear side.

Clearly, in some embodiments, the board element may be divided before arranging the underlay element on the rear side of the thereby divided at least one panel.

Generally, the method may further comprise controlling the applying of the adhesive such that no, or substantially no, adhesive is applied on a rear-side portion of the board element and/or an upper-side portion of the underlay element configured to be further processed, such as by cutting the underlay element, dividing the board element or forming of a locking system. This may result in a simpler separation and/or recycling of the material elements of the board element and the underlay element.

The method may further comprise controlling the applying of the adhesive such that no, or substantially no, adhesive is applied in the at least one cutting portion and/or the at least one dividing portion. Thereby, the underlay element may be separated from the board element more easily in these portions.

The method may further comprise controlling the applying of the adhesive such that no, or substantially no, adhesive is applied in a rear-side portion where a locking system, preferably of at least one panel, is configured to be formed and/or in an upper-side portion of the at least one underlay unit configured to be provided along, such as to contact, the rear-side portion.

When processing, such as when dividing and cutting, and optionally forming a locking system, the board element and underlay element, the removed material will generically be a mix of material elements from the board element, adhesive and underlay element, thereby complicating e.g. recycling. Therefore, the method may further comprise separating material elements, such as chips, shavings or strips, removed from the underlay element and the board element during or after processing of the board element and the underlay element, such as by separating the material elements based on at least one attribute of the underlay element and the board element, respectively. The processing may comprise cutting the underlay element into at least one underlay unit and dividing the board element into at least one panel. Alternatively, or additionally, the processing may comprise forming a locking system on the board element. Optionally, also the material elements of the adhesive contacting the board element and/or underlay element may be separated, such as based on at least one attribute of the adhesive.

The attributes may be physical characteristics of the underlay element, the board element and the adhesive. More specifically, the separation may be based on least one selected from the group of a material composition of the material elements, a size of the material elements, a weight of the material elements, a shape of the material elements, and a density of the material elements.

The method may comprise screening or sieving of the material elements. This may be advantageous when sizes of the material elements, such as a size of the material elements of the underlay element and the board element, differ.

The method may comprise gravity separation, such as specific gravity separation, of the material elements. This may be advantageous when sizes and/or shapes of the material elements, such sizes of the material elements of the underlay element and the board element, are essentially the same.

A density of the underlay element may be less than a density of the board element or panel.

The separation may be based on density separation or cyclonic separation. Alternatively, or additionally, the materials may be separated by using an air classifier. The separation may utilize a dry separation method.

The adhesive may be applied on the rear side and/or the underlay element at an application temperature of the adhesive. In non-limiting examples, the application temperature may be 5-150° C., such as 10-120° C. Generally, in non-limiting examples, an amount of 10-200 $g/m^2$, such as 10-40 $g/m^2$ or 60-120 $g/m^2$, adhesive may be applied on the rear side and/or the underlay element.

The adhesive may be a hot-melt adhesive. Preferably, the application temperature of the hot-melt adhesive is between 100° C. and 140° C. when it is applied, such as 110-130° C.

The method may comprise heating the adhesive, such as a hot-melt adhesive. Thereby, the application temperature of the adhesive may be reached.

A hot-melt adhesive may be used in any of the application methods described herein, such as slot-die coating, roller coating, spraying or curtain coating.

In non-limiting examples, an amount of 10-150 g/m$^2$, preferably 60-110 g/m$^2$, more preferably 70-90 g/m$^2$, hot-melt adhesive may be applied on the rear side and/or the underlay element. An alternative preferred amount in some embodiments is 10-100 g/m$^2$, more preferably 10-50 g/m$^2$.

Generally herein, the hot-melt adhesive may be reactive or non-reactive. In non-limiting examples, the hot-melt adhesive may be a reactive polyurethane (PUR) hot-melt adhesive, Ethylene Vinyl Acetate (EVA) hot-melt adhesive, polyolefin (PO) hot-melt adhesive, copolyamide (CoPA) hot-melt adhesive, or rubber-based pressure-sensitive adhesive (PSA). The EVA hot-melt adhesive and the rubber-based PSA may be non-reactive. The PO hot-melt adhesive may be reactive.

A PUR hot-melt adhesive may provide a strong adhesion between the board element and the underlay element. A non-limiting list of examples of PUR hot-melt adhesives is KLEIBERIT 711.2.00, KLEIBERIT 706.1.38, H.B. Fuller Rapidex NP 2075 LT, Coating P. Materials PR-6620, and Jowatherm-Reaktant 609.40. In non-limiting examples, the PUR hot-melt adhesive may be applied in an amount of 50-100 g/m$^2$, preferably 70-90 g/m$^2$, or sometimes 10-100 g/m$^2$, preferably 10-50 g/m$^2$.

In some embodiments, the adhesive may be a cold adhesive. The cold adhesive may be a one-component (1C) adhesive or a two-component (2C) adhesive. The two-component adhesive may comprise an adhesive and a hardener. The cold adhesive may be a solvent-based adhesive. In some embodiments, however, waterborne cold adhesive is conceivable.

The cold adhesive may be polyurethane (PUR), such as 1C PUR or 2C PUR, styrene copolymer (SBS), chloroprene rubber (CR), two-component epoxy adhesive or EVA. The 1C PUR may be moisture curing. The 2C PUR may comprise isocyanates and polyols. In some applications, the cold adhesive is too slow for using in a fast production line. As a consequence, the cold adhesive may have to be post-treated, see discussion below. In non-limiting examples, an amount of 120-180 g/m$^2$ cold adhesive may be applied on the rear side and/or the underlay element.

In fact, a generic adhesive may be post-treated, such as after application of the adhesive. The method may further comprise drying the adhesive and/or exposing the adhesive to radiation, such as infrared or ultraviolet radiation. The post-treatment may be performed before and/or after arranging the underlay element on the rear side. Preferably, the adhesive is exposed to UV radiation before arranging the underlay element on the rear side. For example, the adhesive may be a UV curable adhesive, such as an acrylic-based adhesive. Alternatively, or additionally, the method may further comprise post-heating the adhesive, i.e. heating the adhesive at or after its application on the rear side and/or on the underlay element. Preferably, the adhesive is heated before arranging the underlay element on the rear side. Thereby, the tackiness of the adhesive may be increased. For example, the applied adhesive may be post-heated when a temperature thereof has decreased below an operational temperature. The operational temperature may be a temperature above which a tackiness of the adhesive exceeds a certain threshold value. The operational temperature may be above the glass transition temperature Tg of the adhesive and/or above the melting temperature Tm of the adhesive. In non-limiting examples, the operational temperature may generally be 5-150° C., such as 10-120° C., and for a hot-melt adhesive 100-140° C., such as 110-130° C. For example, the hot-melt adhesive may be a PUR adhesive. For example, the adhesive applied on a board element may be post-heated after dividing of the board element and/or after forming a locking system on a panel. This may simplify the handling of the board element and/or the underlay element.

In some embodiments, the post-treatment may comprise exposing at least a portion of the adhesive to moisture. Thereby, a curing of a moisture-curing adhesive may be activated and/or accelerated. In fact, the method may further comprise controlling an applied moisture content and/or a relative ambient humidity (RH). Preferably, the adhesive is exposed to moisture before arranging the underlay element on the rear side.

The adhesive may be a pressure-sensitive adhesive, such as an acrylic-based adhesive or a rubber-based adhesive. In non-limiting examples, the PSA may be applied in an amount of 10-100 g/m$^2$, preferably 15-50 g/m$^2$, more preferably 20-30 g/m$^2$.

Generally, the method may further comprise applying pressure on the underlay element and/or the board element, preferably during curing or hardening of the adhesive. Such an application of pressure is conceivable for any type of adhesive, including a pressure-sensitive adhesive and a hot-melt adhesive. Pressure may be applied on the underlay element and/or the board element, preferably such that at least a portion of the upper side, such as the entire upper side, is pressed towards and/or against the rear side. By applying pressure, an adhesion of the underlay element to the board element may increase.

The underlay element may be continuously formed without any holes therein. In some embodiments, however, the underlay element may be discontinuously formed, comprising perforations and/or at least one hole therein. Thereby, a heat transfer from a substructure, such as a subfloor, to the front side may be improved. For example, when attached, the at least one hole may be aligned with the at least one groove. The alignment may be controlled when synchronizing the position of the underlay element with the position of the board element.

The underlay element may comprise a resilient material. Thereby, the underlay element may be provided on a roll and may be more easily transported on rolls. Optionally, the underlay element may be compressible.

The underlay element may comprise a rigid material.

The underlay element may comprise a thermoplastic material.

The underlay element may be a foam, such as a closed-cell foam or an open-cell foam.

The underlay element may comprise, or may be, any of an irradiated cross-linked polyethylene or polypropylene foam (IXPE foam or IXPP foam), an EVA foam, preferably provided as a closed-cell foam, polyolefin (PO) foam, such as cross-linked polyolefin foam (XLPO), or a foam rubber. Moreover, the underlay element may be polystyrene (PS) foam, such as extruded polystyrene (XPS), or polyethylene (PE) foam, such as expanded polyethylene (EPE) or cross-linked polyethylene foam (XLPE), or PET foam.

The underlay element may be a cork-based underlay element, such as a cork sheet. For example, the cork-based underlay element, such as a cork sheet, may be stored on a roll and may delivered therefrom to an underlay applier.

The underlay element may comprise a thermosetting resin, such as polyurethane (PU). For example, the underlay element may be a PU foam.

A thickness of the underlay element, such as a foam or cork-based underlay element, may be between 0.5 mm and 4 mm, such as between 1 mm and 2 mm. A thickness of the board element, such as a panel, may be between 2 mm to 40 mm, such as between 2 mm and 10 mm. A depth of the groove(s) may be larger than 0.5 mm, such as larger than 2 mm.

The board element may be a panel and the method may further comprise forming a locking system for horizontal and/or vertical locking, preferably a mechanical locking system, on at least one edge portion of the panel, preferably on two opposite edge portions thereof, such as on all edge portions. In a first example, the locking system is formed before arranging the underlay element on the rear side. An area and/or a shape of the underlay element may correspond to an area and/or a shape of the rear side of the panel comprising the locking system. In a second example, the locking system is formed after arranging the underlay element on the rear side. A portion of the underlay element may have to be removed when forming the locking system.

It is noted that the steps of the method in accordance with any of the embodiments above are exemplary and do not have to be performed in the exact order disclosed.

According to a second aspect of the inventive concept, there is provided a board element, such as a panel, obtainable by a method according to any embodiment of the first aspect. For example, the board element in the method according to the first aspect may be a panel. Embodiments and examples of the board element in accordance with the second aspect are largely analogous to those of the first, third, fourth and fifth aspects, wherein reference is made thereto.

According to a third aspect of the inventive concept, there is provided a system for attaching an underlay element, such as an underlay unit, to a board element, such as a panel. The system comprises an adhesive applicator and an underlay applier.

The adhesive applicator may be a contact applicator, such as a roll coater or a slot-die coater, or a non-contact applicator, such as a spray coater or a curtain coater.

The adhesive applicator may be configured to apply adhesive by transfer application.

The system may comprise a transportation device configured to transport the board element and/or the underlay element along a respective feeding path.

The system may comprise a pressure device configured to exert pressure on the underlay element and/or the board element. For example, the pressure device may be provided by at least one roller and/or at least one conveyor belt.

The system may comprise a post-treatment device for post-treating the adhesive after application. The post-treatment device may be located upstream and/or downstream of the underlay applier along the feeding path. In some embodiments, the post-treatment device is located at the underlay applier. The post-treatment device may comprise a drying device and/or a radiation device, such as an infrared or an ultraviolet radiation device, configured to dry the adhesive and/or to reduce the curing time or hardening time of the adhesive. Alternatively, or additionally, the post-treatment device may comprise a post-heating device configured to heat the adhesive after application of the adhesive on the board element and/or the underlay element. In some embodiments, the system may comprise a moisture regulator for regulating the applied moisture and/or the RH value. The moisture regulator may be located upstream of the underlay applier along the feeding path.

The system may comprise a separation device configured to separate material elements, such as chips, shavings or strips, removed from the underlay element and the board element during or after processing of the board element and the underlay element, such as by separating the material elements based on at least one attribute of the underlay element and the board element, respectively. The processing may comprise cutting the underlay element into at least one underlay unit and dividing the board element into at least one panel. Alternatively, or additionally, the processing may comprise forming a locking system on the board element. In a first example, the locking system may be formed after arranging the underlay element on the rear side and after dividing of the board element into at least one panel. In a second example, the locking system of a panel per se may be formed before arranging the underlay element on the rear side. Optionally, also the material elements of the adhesive contacting the board element and/or underlay element may be separated, such as based on at least one attribute of the adhesive.

The system may comprise a processing tool, such as a cutting tool and/or a dividing tool.

The system may comprise a control unit. Moreover, the system may comprise a data storage unit and, optionally, a data collecting unit.

Embodiments and examples of the system in accordance with the third aspect are largely analogous to those of the first, second, fourth and fifth aspects, wherein reference is made thereto.

According to a fourth aspect of the inventive concept, there is provided a panel assembly comprising a panel and an underlay unit. A rear side of the panel comprises a groove portion and a remaining portion, the groove portion comprising at least one groove. The underlay unit is attached to the rear side of the panel by an adhesive contacting at least a portion of the remaining portion and a corresponding residual portion of the underlay unit.

Embodiments and examples of the panel in accordance with the fourth aspect are largely analogous to those of the first, second, third and fifth aspects, wherein reference is made thereto. In particular, embodiments and examples of at least one selected from the group of the material composition of the panel, the material composition of the underlay unit, the design of the panel, and the design of the underlay unit may be the same. In addition, at least the following embodiments and examples are conceivable.

The underlay unit may be pre-mounted on the panel.

The remaining portion may have a larger thickness than a thickness of the groove portion, a main portion of the remaining portion preferably having a constant thickness.

The adhesive may be applied in a pattern arrangement.

At least two grooves may have been discontinuously formed. The adhesive may be provided between the discontinuous grooves, such as along a first and/or a second horizontal direction of the panel.

The panel may comprise at least one layer and the at least one groove may at least partly penetrate the at least one layer, such as at least a bottom layer.

The at least one layer, optionally comprising a top layer and/or a bottom layer, such as a backing layer, may each comprise a polymer-based material, such as a thermoplastic material, and, preferably, a filler.

The underlay unit may be a foam, such as a closed-cell foam or an open-cell foam, or may be embodied as in any other embodiment described in relation to the first aspect.

In accordance with a fifth aspect of the inventive concept, there is provided a method for attaching an underlay element, such as an underlay unit, to a board element, such as a panel. The method comprises: providing a board element, wherein a rear side of the board element comprises a groove portion and a remaining portion, the groove portion comprising at least one groove, providing an underlay element comprising a pre-applied adhesive, and arranging the underlay element on the rear side of the board element, such that the adhesive contacts the underlay element and the rear side.

The adhesive may be applied on at least a portion of a corresponding residual portion of the underlay element. For example, the adhesive may be applied on the corresponding residual portion only.

The method may further comprise synchronizing a position of the underlay element with a position of the board element, such that the underlay element becomes aligned with the board element, preferably such that a cover portion is aligned with the groove portion and a corresponding residual portion is aligned with the remaining portion.

The underlay element may be provided with a release liner, such as a release film, and the method may further comprise removing the release liner before arranging the underlay element on the rear side.

Embodiments and examples of the method in accordance with the fifth aspect are largely analogous to those of the first aspect, wherein reference is made thereto. In particular, embodiments and examples of at least one selected from the group of the material composition of the board element/panel, the material composition of the underlay element/unit, the design of the board element/panel, and the design of the underlay element/unit may be the same. Moreover, the application details, such as pattern arrangements, of the pre-applied adhesive may be the same as in the first aspect.

Further aspects of the inventive concept and embodiments and examples of each of the first, second, third, fourth and fifth aspects are provided in an embodiment section below.

It is emphasized that the embodiments and examples of any aspect may be combined with embodiments and examples of any other aspect.

Generally, all terms used in the claims are to be interpreted according to their ordinary meaning in the technical field, unless explicitly defined otherwise herein. All references to "a/an/the [element, device, component, means, step, etc.]" are to be interpreted openly as referring to at least one instance of said element, device, component, means, step, etc., unless explicitly stated otherwise.

BRIEF DESCRIPTION OF THE DRAWINGS

The disclosure will in the following be described in connection to exemplary embodiments and in greater detail with reference to the appended exemplary drawings, wherein.

DETAILED DESCRIPTION

Figure 1A:
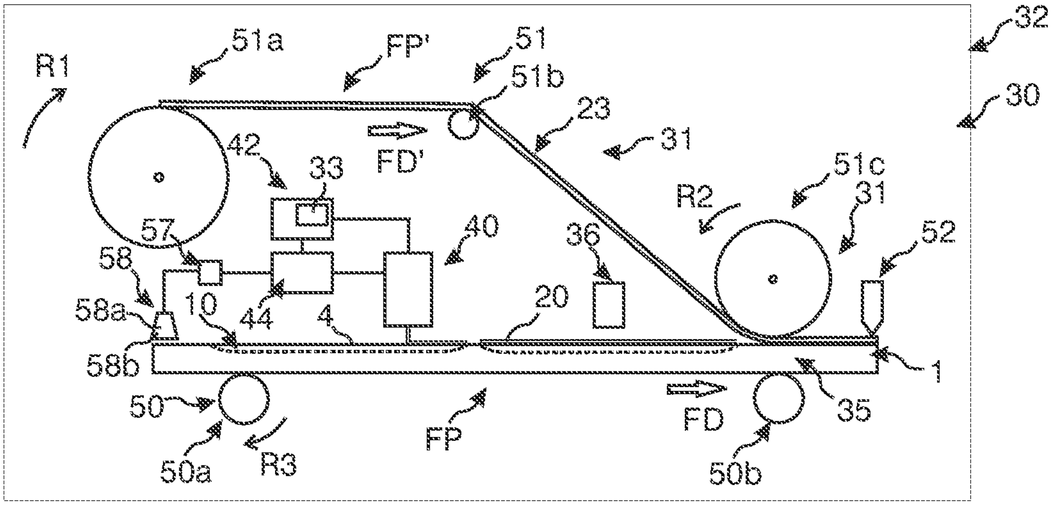
FIGS. 1*a*-1*c* illustrate in side views embodiments of a system for attaching an underlay element to a board element.

Next, embodiments of a method for attaching an underlay element 23, such as an underlay unit 23*a*, 23*b*, to a rear side 4 of a board element 1, such as a panel V, comprising at least one groove 10 and embodiments of a system 30 configured to implement the method will be described with reference to inter alia FIGS. 1*a*-1*c*, 2*a*-2*e*, 3*a*-3*e*, 5*a*-5*l*, 6 and 7*a*-7*c*. Reference will typically be made to a panel which is a floor panel, such as a plank or a tile, but it is understood that in some embodiments the panel may be a building panel, wall panel, ceiling panel or furniture panel.

Figure 1B:
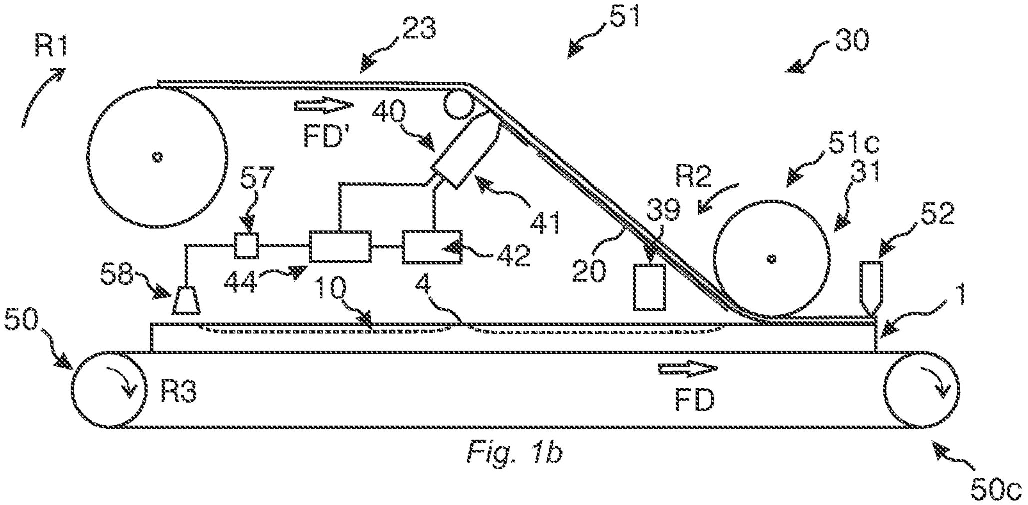
Figure 1C:
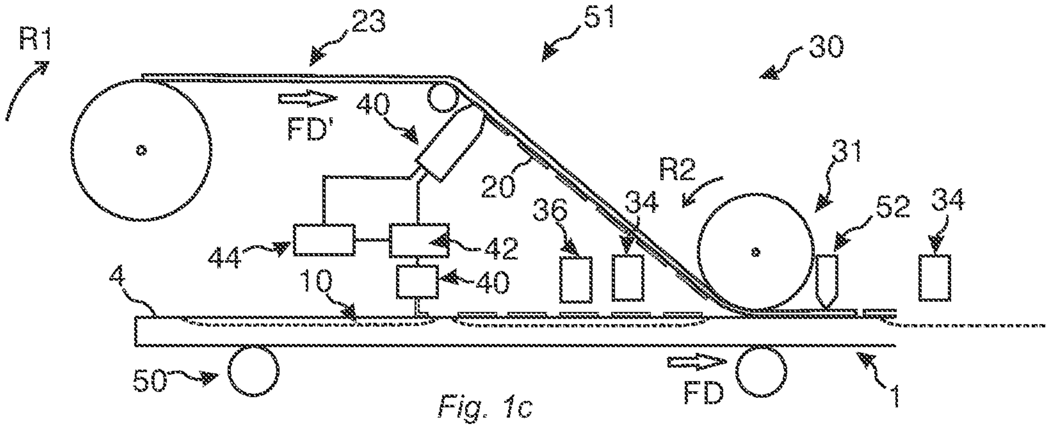

FIGS. 1*a*-1*c* schematically illustrate in side views embodiments of a system 30 for attaching an underlay element 23 to a board element 1, such as a panel 1'. The system 30 comprises an adhesive applicator 40 and an underlay applier 31. The application of an adhesive 20 and/or the arrangement of an underlay element on the rear side may be carried out in a continuous process.

As shown in FIG. 1*a*, the system may further comprise a transportation device 50, 51 configured to transport the board element along a feeding path FP and/or the underlay element along a feeding path FP'. A feeding direction FD of the board element and a feeding direction FD' of the underlay element may be parallel at least along a portion of the feeding paths, such as at a location where the underlay element is arranged on the rear side 4. The transportation device 50, 51 may be any transportation device known in the art. For example, it may comprise at least one roller 50*a*, 50*b*, 51*a*, 51*b*, 51*c*, rotating in the directions R1, R2, R3 and optionally comprising a driving mechanism (not shown) for driving at least one roller 50*a*-50*b*, 51*a*-51*c*, at least one conveyor belt 50*c*, or similarly. For sake of clarity, the transportation device 50 will sometimes be suppressed in embodiments disclosed herein. At least a component of the underlay applier 31 may be provided by the transportation device 51, such as being provided by the at least one roller 51*c*.

A speed of the board element and a speed of the underlay element along the feeding paths FP, FP' may be synchronized during operation of the system 30, such as being substantially the same. For example, the speed may be 3-130 m/min, such as 15-100 m/min or 20-50 m/min.

The system 30 may further comprise a frame 32 in which the underlay applier and adhesive applicator, and optionally the transportation device, are arranged. Preferably, the underlay applier and the adhesive applicator, and optionally the transportation device, are fixedly mounted in the frame. The presence of a frame 32 is understood in the following, but will be suppressed for sake of clarity.

The underlay applier 31 may be loaded with an underlay element 23 configured to be arranged on the rear side of the board element. Generally, the underlay element may comprise at least one underlay unit 23*a*, 23*b* per se or it may be cuttable into at least one underlay unit 23*a*, 23*b*. The underlay element may be cut into suitable sizes by a cutting tool 52 which may be provided in the system 30, see, e.g., FIGS. 1*a*-1*c* and 2*d*. The cutting tool may comprise a rotating cutting device, a carving device or a knife arrangement comprising at least one knife. In a first example, the cutting tool is fixedly mounted in the frame 32. In a second example, the cutting tool is displaceably mounted in the frame. The cutting tool 52 may be positioned downstream of the underlay applier 31 along the feeding path FP'. Alternatively, as noted above, the underlay applier may comprise at least one underlay unit 23*a*, 23*b* that may be stored therein and that may be delivered therefrom, see, e.g., FIG. 3*d*.

The adhesive applicator 40 may comprise or may be connected to an adhesive reservoir 42. Moreover, a control unit 44 may control the application of the adhesive.

The embodiment in FIG. 1*a* schematically illustrates a general adhesive applicator 40, which may be a contact applicator, such as a roll coater 43 or a slot-die coater 41, or a non-contact applicator, such as a spray coater 45 or a curtain coater 46. As shown in FIG. 1*a*, the adhesive applicator may be configured to apply adhesive 20 on the board element 1, such as a panel V. Moreover, as shown in FIG. 1*b*, the adhesive applicator may be configured to apply adhesive on the underlay element 23, such as an underlay unit 23*a*, 23*b*. Also, as shown in FIG. 1*c*, the adhesive applicator may be configured to apply adhesive on the board element 1, such as a panel V, and on the underlay element 23, such as an underlay unit 23*a*, 23*b*.

A position of the underlay element may have to be synchronized with a position of the board element, such that the underlay element becomes aligned with the board element. The synchronization may be controlled by the control unit 44.

The adhesive may be a hot-melt adhesive, such as a PUR hot-melt adhesive, but other adhesives suitable for the intended purpose as will be clear from the discussion herein are equally conceivable.

In a first example, the panel may be an SPC panel, the PUR hot-melt adhesive may be KLEIBERIT 711.2.00, and the underlay element may be an IXPE foam, an EVA foam or a cork sheet. In a second example, the panel may be an EPC panel, the PUR hot-melt adhesive may be H.B. Fuller Rapidex NP 2075 LT, and the underlay element may be an IXPE foam, an EVA foam or a cork sheet. In a third example, the panel may be an LVT tile, the PUR hot-melt adhesive may be H.B. Fuller Rapidex NP 2075 LT, and the underlay element may be an IXPE foam, an EVA foam or a cork sheet.

As shown in FIG. 1*a*, the system 30 disclosed herein may further comprise a heating device 33 for heating the adhesive, such as a hot-melt adhesive, before application. For example, the heating device may heat the adhesive to an application temperature. The system 30 in any embodiment disclosed herein may further comprise a post-treatment device 34, such as a drying device and/or a radiation device, such as an infrared or an ultraviolet radiation device. The post-treatment device may be located at and/or downstream of the underlay applier 31 along the feeding path FP'. Alternatively, or additionally, however, in some embodiments the post-treatment device 34, such as an ultraviolet radiation device, may be located upstream of the underlay applier 31. Alternatively, or additionally, the system may comprise a post-heating device 36 configured to heat the adhesive after its application.

Such embodiments are shown in, e.g., FIG. 1*c*.

In some embodiments, and as show in FIG. 1*b*, the post-treatment may comprise exposing the adhesive to moisture, such as by a moisture regulator 39. In fact, the method may further comprise controlling an applied moisture content and/or an RH value. Preferably, the moisture regulator is provided upstream of the underlay applier 31 along the feeding path FP and/or FP'.

Optionally, the system 30 may further comprise a pressure device 35 configured to exert pressure on the underlay element and/or the board element, preferably located at and/or downstream of the underlay applier 31 along the feeding path FP'. At least a component of the pressure device 35 may be provided by the transportation device 50, 51, such as being provided by the at least one roller 50*b*, 51*c*, or by the at least one roller 51*c* and a part of the transportation device 50, such as the at least one conveyor belt 50*c*, or similarly. For example, a distance between components of the transportation device between which the board element may be fed, such as a pair of rollers or a roller and a portion of a conveyor belt, may be smaller than a combined thickness of the board element and the underlay element, preferably including the adhesive.

As shown schematically in the embodiments in FIGS. 1*b*-1*c*, 2*a*-2*b* and 2*e*, the adhesive may be applied by contact application, such as by slot-die coating or by roller coating. As described above, the adhesive applicator 40 in FIG. 1*a* may be a contact applicator, such as a roll coater 43 or a slot-die coater 41. Moreover, any or both of the adhesive applicators 40 in FIG. 1*c* may be a contact applicator, such as a roll coater 43 or a slot-die coater 41.

Figure 2A:
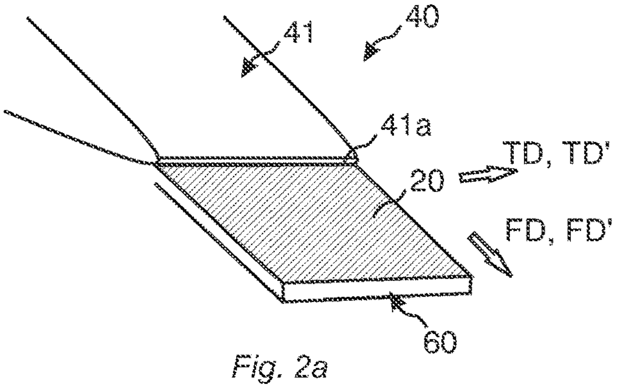
FIGS. 2*a*-2*e* illustrate embodiments of an adhesive applicator in perspective views and embodiments of a system for attaching an underlay element to a board element in side views.
Figure 2E:
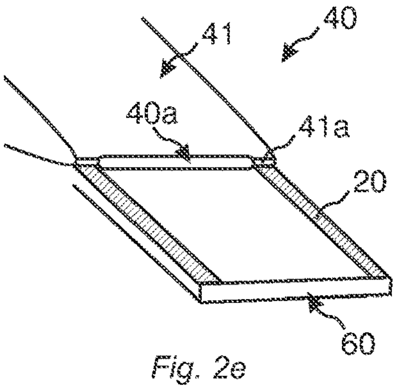

FIG. 1*b* shows a slot-die coater 41 that applies adhesive 20 on the underlay element 23, such as directly on it. The adhesive may be applied from below, such as when the underlay element is fed in a horizontal or an inclined direction. FIG. 2*a* generally shows in a perspective view slot-die coating on a substrate 60, which may be a board element 1, such as a panel V, or an underlay element 23, such as an underlay unit 23*a*, 23*b*. The slot-die coater may form an adhesive coating on the substrate 60 which may be continuous in a direction TD or TD' transverse to the feeding direction FD or FD', respectively, the direction TD, TD' preferably being parallel with the rear side 4 in operation. In some embodiments, however, the adhesive coating on the substrate 60 may be discontinuous in the direction TD or TD', see FIG. 2*e* where the slot-die coater is used in conjunction with at least one mask 40*a*. The adhesive may be deposited from at least one nozzle 41*a* extending in the transverse direction TD or TD', depending on whether the substrate is a board element or an underlay element, respectively.

Figure 2B:
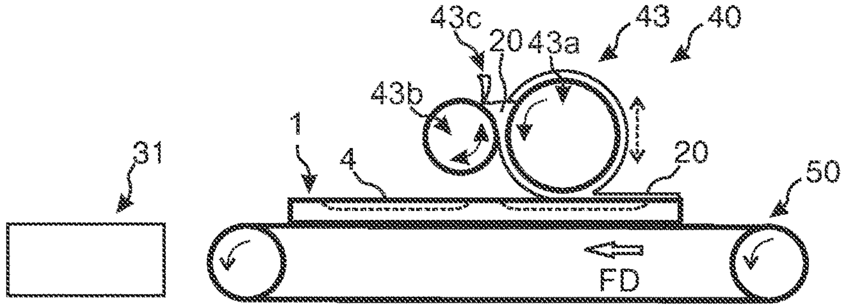

The side view in FIG. 2*b* shows an embodiment in which the adhesive applicator 40 comprises at least one roll coater 43, such as an application roller 43*a* and a metering roller

43*b*, and preferably a doctor blade 43*c*. The adhesive applicator may apply adhesive 20 on the board element 1, such as directly on it. Generally herein, it is understood that the at least one roll coater 43 may rotate during application of the adhesive. Preferably, a rotating mechanism (not shown) may be configured to rotate the at least one roll coater 43.

As schematically shown in side views and in a perspective view in the embodiments in FIGS. 2*c*-2*d* and 3*a*-3*b*, the adhesive may be applied by non-contact application, such as by spraying or curtain coating. It is recalled that the adhesive applicator 40 in FIG. 1*a* may be a non-contact applicator, such as a spray coater 45 or a curtain coater 46. In operation, the non-contact applicator may generally be spaced from the underlay element.

Figure 2C:
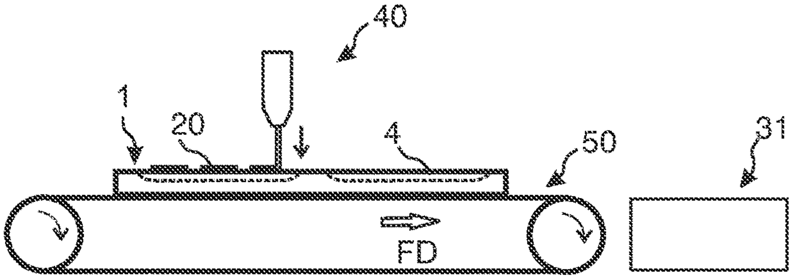

FIG. 2*c* generally illustrates non-contact application of an adhesive 20 on a board element 1 by an adhesive applicator 40, such as a spray coater 45 or a curtain coater 46.

Figure 2D:
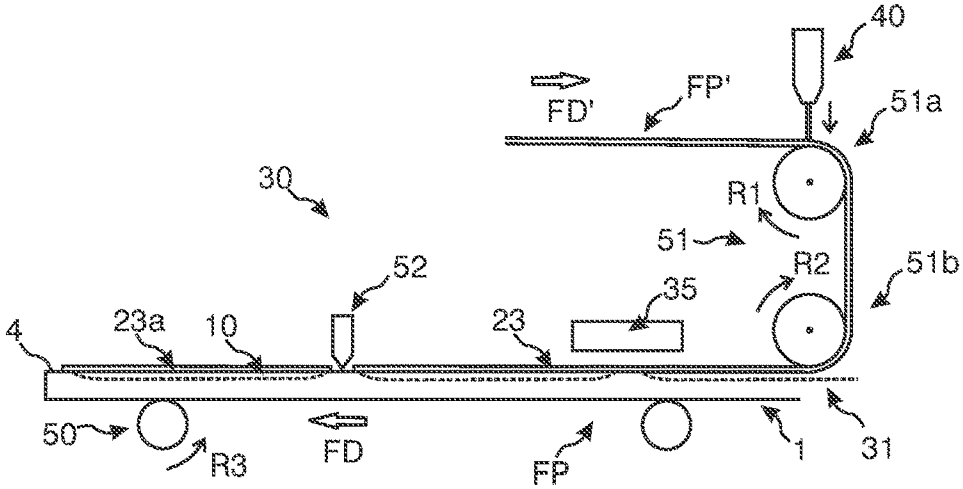

Moreover, FIG. 2*d* generally illustrates non-contact application of an adhesive 20 on an underlay element 23 by an adhesive applicator 40, such as a spray coater 45 or a curtain coater 46. The application of the adhesive and/or the arrangement of the underlay element on the rear side may be carried out in a continuous process. The transportation device 50, 51 configured to transport the board element along a feeding path FP and/or the underlay element along a feeding path FP' may be implemented as described elsewhere in this disclosure, such as by at least one roller 50*a*, 50*b*, 51*a*, 51*b*, rotating in the directions R1, R2, R3, and optionally comprising a driving mechanism (not shown) for driving at least one roller, at least one conveyor belt, or similarly. Other features of the embodiment in FIG. 2*c* may be similar to the embodiment described in relation to any of the embodiments in FIGS. 1*a*-1*c*, whereby reference is made thereto.

Figure 3A:
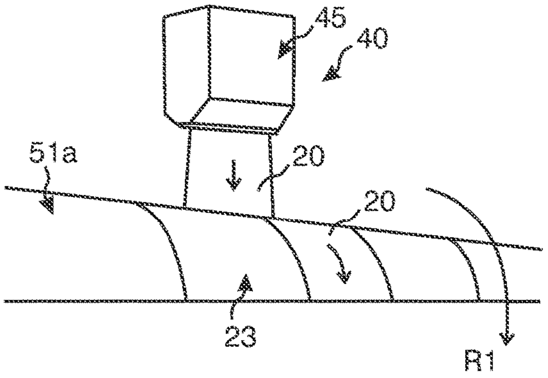
FIGS. 3*a*-3*d* illustrate embodiments of adhesive applicator in perspective views and embodiments of a system for attaching an underlay element to a board element in side views.
Figure 3B:
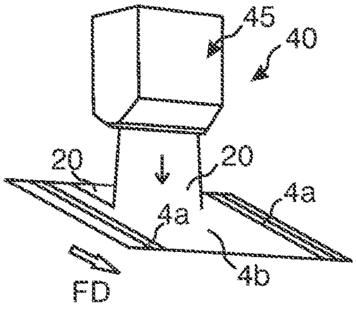

FIG. 3*a* is a zoomed-in perspective view of the area around the adhesive applicator 40 in FIG. 2*d*, which here is provided in the form of a spray coater 45. It is clear that a spray coater 45 may apply adhesive 20 on the rear side 4, such as on a remaining portion 4*b* described below, as schematically illustrated in FIG. 3*b*, which may be a zoomed-in perspective view of the area around the adhesive applicator 40 in FIG. 2*c*.

Figure 3C:
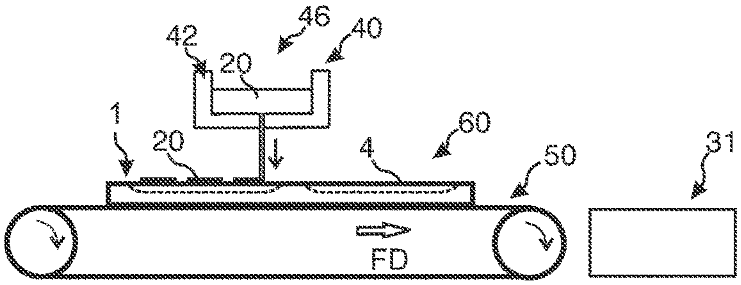

In some embodiments, and as discussed elsewhere in the disclosure, the non-contact applicator 40 may be a curtain coater 46 which is schematically illustrated in FIG. 3*c* in operation on a substrate 60, which here is a board element 1, such as panel 1'. It is understood, however, that in some embodiments the substrate 60 on which the adhesive 20 is applied may be an underlay element. The adhesive 20 may be stored in an adhesive reservoir 42 as shown in FIG. 3*c*.

In some embodiments, the adhesive applicator 40 in FIG. 2*d* may be a contact applicator, such as a roll coater 43 or a slot-die coater 41.

It is understood that in the embodiments in FIGS. 2*b*-2*c* and 3*c*, after the application of the adhesive, an underlay element may be arranged on the board element 1 by the underlay applier 31, which may be embodied in accordance with any embodiment described herein, such as in any of FIG. 1*a*-1*c*, 2*d*, 3*d* or 5*f*.

The arrangement of the underlay element on the rear side may be carried out in a discontinuous process, for example such that the underlay applier 31 operates intermittently. As illustrated schematically in FIG. 3*d*, the underlay applier 31 in any embodiment herein, such as in any of FIGS. 1*a*-1*c*, 2*b*-2*c*, 3*c* and 5*f*, may comprise at least one underlay unit 23*a*, 23*b* that may be stored therein. The area and/or shape of an underlay unit 23*a*, 23*b* may correspond to the area and/or a shape of the rear side of the board element 1 or panel 1'. The underlay applier may be adapted to arrange the at least one underlay unit on the rear side 4 of the board element 1 or panel 1'. The at least one underlay unit may be arranged thereon sequentially, such as individually. Any known method in the art may be utilized, for example a method using suction cups 55. The control unit 44 may control the operation of the underlay unit.

Figure 3D:
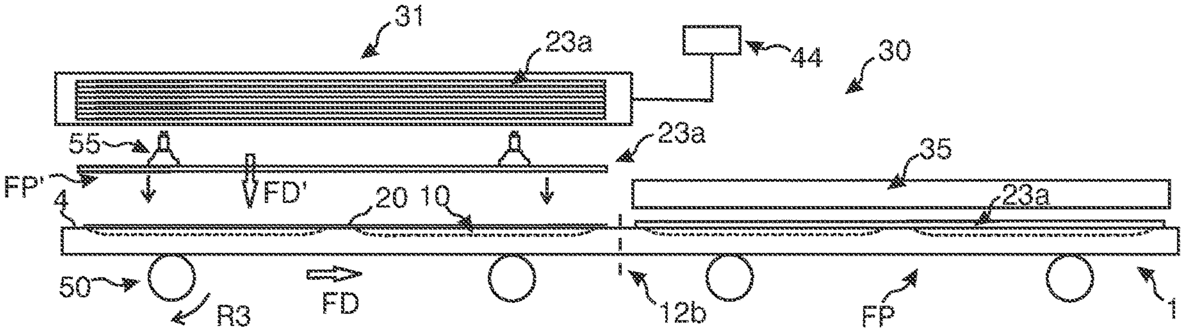

Optionally, the system 30 in FIG. 2*d* or 3*d* may further comprise a pressure device 35 configured to exert pressure on the underlay element and/or the board element, preferably located at and/or downstream of the underlay applier 31 along the feeding path FP'.

FIGS. 4*a*-4*f* illustrate embodiments of a board element 1, such as a panel V, obtainable by at least some of the embodiments of the method disclosed herein. Indeed, embodiments of the system 30 described herein, such as in any of FIGS. 1*a*-*c*, 2*a*-2*e*, 3*a*-3*d* and 5*a*-5*l*, may be used to implement a method for attaching an underlay element 23, such as an underlay unit 23*a*, 23*b* to a board element 1 or a panel 1', which are shown in a perspective view in FIG. 4*a* and FIG. 4*b*, respectively.

A panel 1' and an underlay unit 23*b* may be referred to as a panel assembly. FIG. 4*c* illustrates in a bottom view an embodiment of a rear side 4 of a panel V comprising a groove portion 4*a* comprising at least one groove 10 and a remaining portion 4*b* without any grooves. The remaining portion may be provided in a horizontal plane HP extending along the rear side. The horizontal plane HP may be parallel with a horizontal plane extending along a front side 2 of the panel 1'.

As shown in FIG. 4*c*, the at least one groove 10 is preferably provided in an interior of the rear side 4, thereby being spaced from a pair of opposite edge portions, such as opposite short edge portions 1*c*, 1*d*, of the panel, preferably being spaced from all edge portions 1*a*, 1*b*, 1*c*, 1*d*.

Figure 4A:
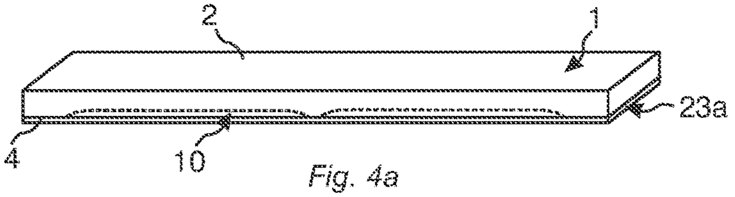
FIGS. 4*a*-4*f* illustrate embodiments of a board element and a panel in perspective views, a bottom view and side views as well as an underlay element in a top view.
Figure 4B:
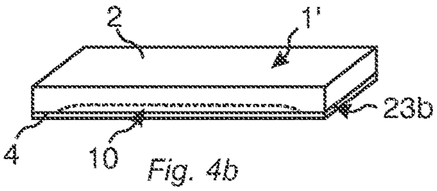
Figure 4C:
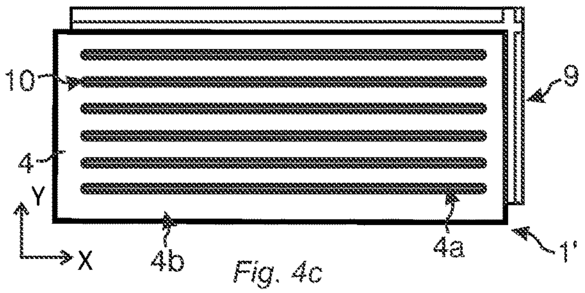
Figure 4D:
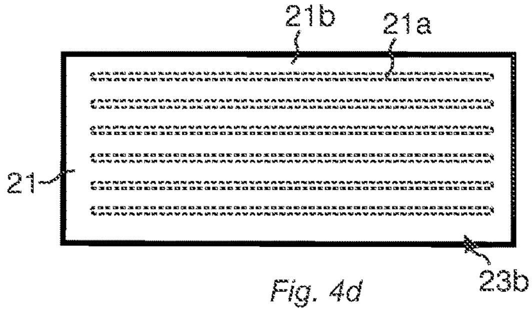
Figure 4E:
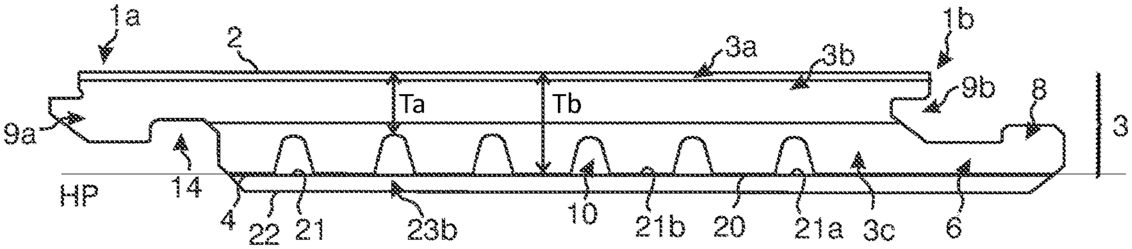

As shown in the embodiment in FIG. 4*d* in a top view, the underlay element 23, such as the underlay unit 23*a*, 23*b*, comprises an upper side 21 configured to face the board element or panel and an opposite underside 22, cf. FIG. 4*e*. The upper side 21 comprises a cover portion 21*a* and a corresponding residual portion 21*b* configured to face and to be aligned with the groove portion 4*a* and remaining portion 4*b*, respectively, when the underlay element is attached to the rear side.

Figure 4F:
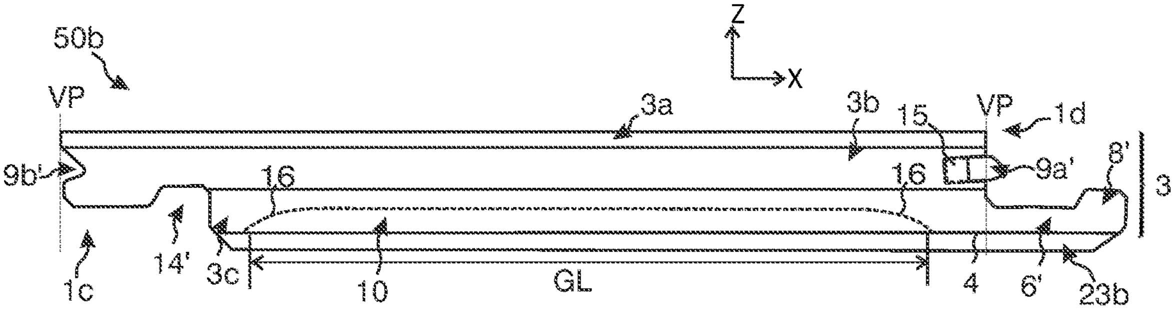

FIGS. 4*e* and 4*f* schematically illustrate in side views an embodiment of a panel 1' comprising long edge portions 1*a*, 1*b* and short edge portions 1*c*, 1*d*, respectively, wherein an underlay unit 23*b* is attached to the rear side 4 of the panel. For example, the panel and underlay unit may correspond to those disclosed in FIGS. 4*c*-4*d*. The adhesive 20 contacts at least a portion of a remaining portion 4*b* and a corresponding residual portion 21*b* of the underlay element and thereby attaches the underlay unit to the rear side.

The panel 1', or generally the board element 1, may comprise a layer arrangement 3 comprising at least one layer 3*a*, 3*b*, 3*c*. Optionally, the layer arrangement 3 may comprise a bottom layer 3*c* which may be a backing layer. Thereby, the at least one groove 10 at least partly penetrates the at least one layer 3*a*, 3*b*, 3*c*, such as at least the bottom layer 3*c*.

Generally, the panel 1' may comprise a locking system 9 for horizontal and/or vertical locking, preferably a mechanical locking system, on at least one edge portion, preferably on two opposite edge portions thereof. FIGS. 4*c*-4*e* illustrate a mechanical vertical locking system comprising a tongue 9*a*, 9*a'* and a tongue groove 9*b*, 9*b'* formed on the long edge portions 1*a*, 1*b* and on the short edge portions 1*c*, 1*d*. Moreover, FIGS. 4*c*-4*e* illustrate a mechanical horizontal locking system comprising a locking element 8, 8' provided on a locking strip 6, 6' and a locking groove 14, 14' formed on the long 1*a*, 1*b* and short 1*c*, 1*d* edge portions. The tongue 9*a* on the long edge portion 1*a* may be integrally formed with the panel and the tongue 9*a'* on the short edge portion 1*d* may be separately formed from the panel and being provided in an insertion groove 15. The tongue 9*a'* may be a displaceable tongue, preferably being flexible. It is clear that the locking system in FIGS. 4*c*-4*f* is exemplary and that other locking systems are equally conceivable.

In some embodiments, the locking system 9 may comprise at least one connecting element configured to be attached to the rear side 4 of adjacent panels, such as in their corner portions, for interconnecting them. Each connecting element may comprise an adhesive layer configured to contact the rear side of adjacent panels. For example, the connecting element may be an adhesive tape.

The panel may extend in a first horizontal direction X and a second horizontal direction Y, which may extend in parallel with long edge portions 1*a*, 1*b* and the short edge portions 1*c*, 1*d* of the panel, respectively.

A groove length GL of the at least one groove 10, such as along the first horizontal direction X, may be less than a distance between components of the locking system 9, such as on the distance between the short edge portions 1*c*, 1*d*. In an embodiment, the groove length GL may be at least 75% of the distance between components of the locking system 9, such as at least 85% of the distance, such as at least 90% of the distance. In a first example, the groove length GL is less than a distance from an inner wall of the locking groove 14' to a vertical plane VP extending along an edge portion of the panel, such as a short edge portion 1*d* comprising the locking strip 6'. The vertical plane VP may be provided along an upper portion of the short edge portion 1*d* and may extend perpendicularly to the horizontal plane HP. In a second example, the groove length GL is less than a distance from the inner wall of the locking groove 14' to an innermost wall portion of the insertion groove 15, which may be provided on the short edge portion 1*d* comprising the locking strip 6'.

It is conceivable, however, and as illustrated in FIG. 4*b*, that the panel 1' in some embodiments is not provided with a mechanical locking system. For example, it may be adapted to be provided loosely on a subfloor or it may be glued to the subfloor.

The remaining portion 4*b* may have a larger thickness Tb than a thickness Ta of the groove portion 4*a*. Moreover, a main portion of the remaining portion preferably has a constant thickness, such as in areas that are spaced from the edge portions 1*a*-1*d* where the locking system 9, preferably a mechanical locking system comprising a tongue 9*a*, 9*a'* and a tongue groove 9*b*, 9*b'* and/or a locking element 8, 8' and a locking groove 14, 14', is formed.

Preferably, a shape of end portions 16 of the grooves 10 along their longitudinal direction are curved. For example, this shape may be obtained when the grooves are formed by a rotating cutting device.

The at least one layer 3*a*, 3*b*, 3*c* in the layer arrangement 3 may each comprise a polymer-based material, such as a thermoplastic material, and, preferably, a filler. The layer(s) may be (co-)extruded. In this embodiment the thermoplastic material is PVC, but it is clear that other thermoplastic materials may be used, such as PE, PP, PET or ABS. The filler of any layer may be a mineral material, such as calcium carbonate ($CaCO_3$) or stone material, such as stone powder, or similarly. Optionally, at least some of the layers, such as all layers, may comprise a plasticizer and/or additives. By way of example, the floor panel may be an LVT tile, an SPC panel, an EPC panel, or an WPC panel.

In other embodiments, the polymer-based material may be a thermoset. For example, the panel may comprise an HDF core and, optionally, at least one wood-fibre based layer attached to the core. By way of example, the floor panel or wall panel may be a Nadura® panel or a Woodura® panel.

In other embodiments, the panel may be a mineral-based panel, such as a cementitious panel or such as comprising magnesium oxide and, optionally, magnesium chloride and/or magnesium sulphate. By way of example, the panel, such as a floor panel or wall panel, may be, or may comprise, an MgO panel, cement board or fibre cement board.

The underlay element 23, such as the underlay unit 23*a*, 23*b*, may comprise a resilient material. Preferably, the underlay element in any of the embodiments disclosed herein, such as in FIGS. 1*a*-1*c*, 2*d*, 3*d*-3*e*, 4*a*-4*b*, 4*d*-4*f*, 5*a*-5*d*, 5*f*-5*l* and 7*a*-7*c* is a foam, such as a closed-cell foam, for example an IXPE foam, an EVA foam, an XLPE foam, a foam rubber or a PU foam. In some embodiments, however, such as in any of said figures, the underlay element may comprise cork, such as being a cork sheet. In yet some embodiments, the underlay element may comprise a thermosetting resin, such as PU.

It is understood that similar features as described in FIGS. 4*b*-4*f* for a panel 1' and an underlay unit 23*b* also are possible for a board element 1 and an underlay unit 23*a*.

Figure 5A:
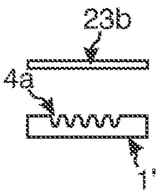
FIGS. 5*a*-5*l* illustrate an embodiment of an attachment of an underlay unit to a panel in side views and embodiments of a system and a method for attaching an underlay element to a board element in bottom views and side views.
Figure 5B:
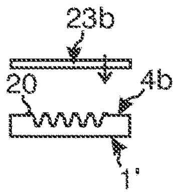
Figure 5C:
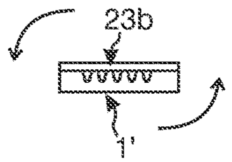
Figure 5D:
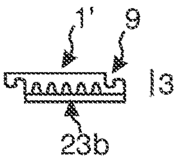
Figure 5E:
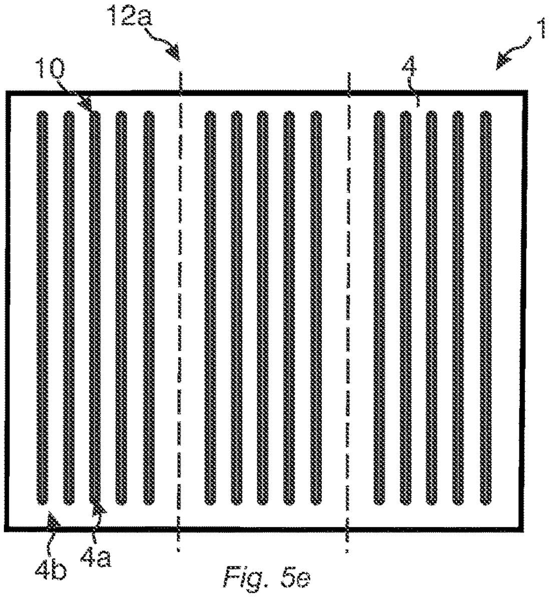
Figure 5F:
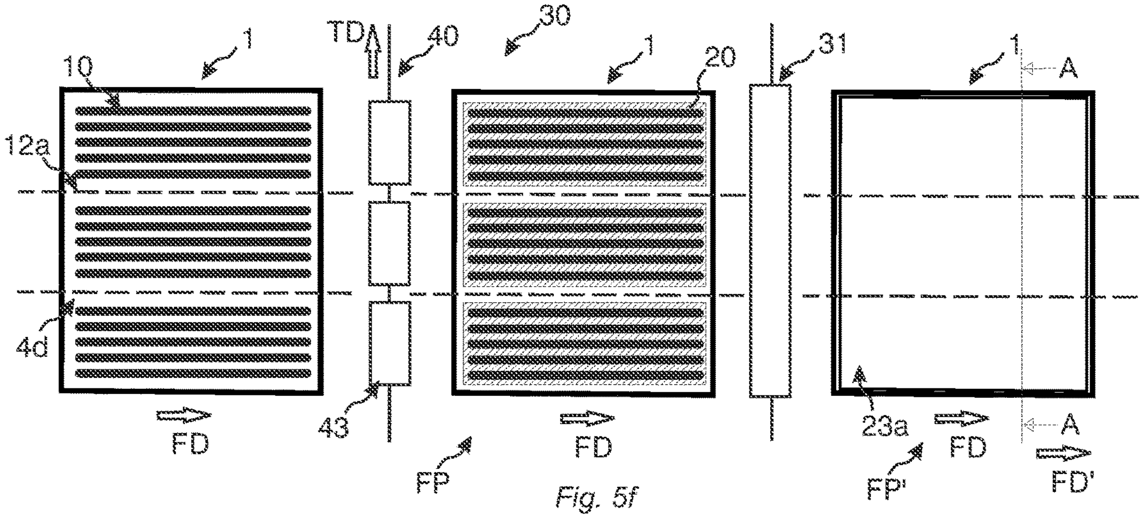
Figure 5G:
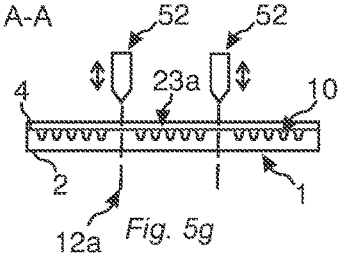
Figure 5H:
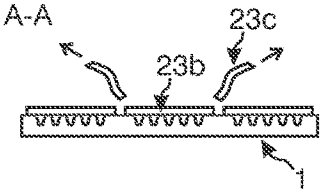
Figure 5I:
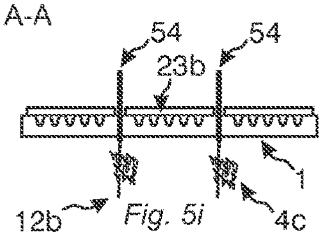
Figure 5J:
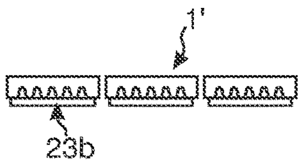
Figure 5K:
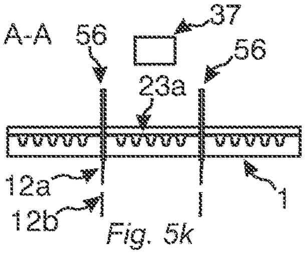
Figure 5L:
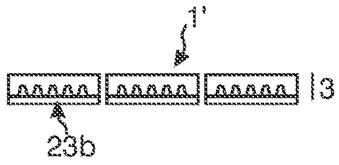
Figure 6:
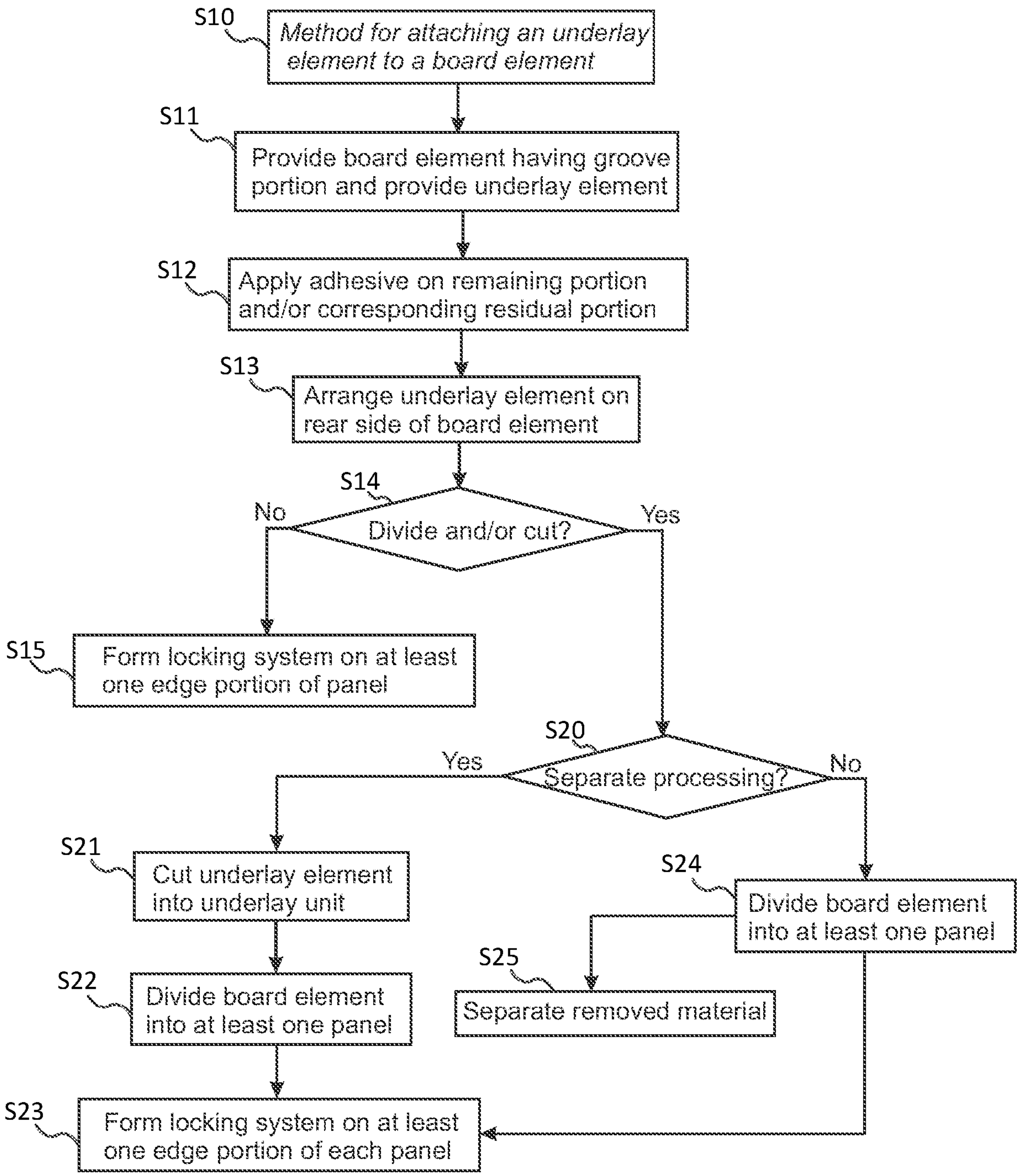
FIG. 6 is a flow chart illustrating an embodiment of a method for attaching an underlay element to a board element.

Embodiments of a system 30 and a method for attaching an underlay element, such as an underlay unit, to a board element, such as a panel, are shown schematically in the embodiments in FIGS. 5*a*-5*l* and illustrated in a flow chart in FIG. 6 (Box S10), respectively. In the following reference will also be made to the system described in relation to e.g. FIGS. 1*a*-1*c*, 2*a*-2*e* and 3*a*-3*d* and the embodiments of a board element/panel in FIGS. 4*a*-4*f* and 7*a*-7*c*.

FIGS. 5*a*-5*d* schematically illustrate in side views an arrangement of an underlay unit 23*b* on a rear side of a panel 1'. Moreover, FIGS. 5*e*-5*f* illustrate an arrangement of an underlay unit 23*a* on a rear side of a board element 1, preferably in a continuous process, whereby the board element and the underlay element are fed along a feeding path FP, FP', such as along a feeding direction FD, FD'.

Generally, the method comprises providing a board element 1 as illustrated in FIG. 5*e* or a panel V as illustrated in FIG. 4*c* or FIG. 5*a* and an underlay element 23 or an underlay unit 23*a*, 23*b* as illustrated in FIG. 4*d* or FIG. 5*a* (Box S11), wherein the board element or panel comprises a groove portion 4*a*. Moreover, the method comprises applying an adhesive 20 on at least a portion of the remaining portion 4*b* and/or on at least a portion of the corresponding residual portion 21*b* of the underlay element (Box S12), see FIGS. 5*b* and 5*f*. The application may also be implemented as in any of the embodiment described in e.g. FIGS. 1*a*-1*c*, 2*a*-2*e* and 3*a*-3*c*.

The adhesive applicator 40 in FIG. 5*f* may comprise at least one roll coater 43. The adhesive 20 may be applied during a displacement of the board element 1 and/or the underlay element 23 along the feeding path FP, FP'. Preferably, at least two roll coaters 43 are spaced from each other in a transverse direction TD. Thereby, no, or substantially no, adhesive is applied in at least one cutting portion 12*a* where the underlay element is configured to be cut into at least one underlay unit, such as at least two underlay units, and/or in at least one dividing portion 12*b* where the board element is configured to be divided into at least one panel, such as at least two panels. Also, preferably no, or substantially no, adhesive is applied in a rear-side portion 4*d* where a locking system 9 of at least one panel 1' is configured to be formed. The divided panels may be essentially similar.

After application of the adhesive as described above, the underlay element 23 is arranged on the rear side of the board element or panel (Box S13) by an underlay applier 31 such that the adhesive contacts the underlay element and the rear side, see, e.g., FIGS. 5*c* and 5*f*. Preferably, the arranging of the underlay element on the rear side is performed during a displacement of the board element and/or the underlay element along the feeding path FP and/or FP', such as in any of FIGS. 1*a*-1*c* and 2*d*, but it is equally conceivable that said arranging may be carried out in a discontinuous process as described, e.g., in relation to FIG. 3*d*.

In a first scenario, the board element is a panel 1' and the underlay element is an underlay unit 23*b*, wherein no dividing and/or cutting is needed (Box S14), such as in the embodiments in FIGS. 4*b*-4*d*, 5*c*, 5*j*, 5I and 7*a*. Hence, the panel and underlay unit may have formats that are adapted to each other. For example, the panel may be adapted to be provided loosely on a subfloor or it may be glued to the subfloor. In other examples, a locking system 9, preferably a mechanical locking system comprising a tongue 9*a*, 9*a*' and a tongue groove 9*b*, 9*b*' and/or a locking element 8, 8' and a locking groove 14, 14', may be pre-formed on at least one edge portion of the panel 1*a*, 1*b*, 1*c*, 1*d*, such as on all edge portions, see e.g. FIGS. 4*c*-4*f*, 5*d* and 7*c*. Optionally, however, a locking system 9, preferably a mechanical locking system comprising a tongue 9*a*, 9*a*' and a tongue groove 9*b*, 9*b*' and/or a locking element 8, 8' and a locking groove 14, 14', may be post-formed (Box S15) on at least one edge portion of the panel 1*a*, 1*b*, 1*c*, 1*d*, such as on all edge portions according to known principles in the art, see e.g. FIGS. 4*c*-4*f*, 5*d* and 7*b*-*c*. FIG. 5*d* shows a panel 1' comprising a mechanical locking system, such as fold-down mechanical locking system, for horizontal and/or vertical locking. In any of the embodiments of the panel described herein, with or without a locking system, horizontally outermost portions of the underlay element and the rear side may be aligned, such as along their first X and/or second Y horizontal directions.

In a second scenario, and as illustrated in the embodiments in, e.g., FIGS. 1*a*-1*c*, 2*d*, 3*d*, 5*g*-5*l* and 7*a*-7*c*, the board element and/or the underlay element may be divided and/or cut (Box S14). The embodiments in FIGS. 5*g*-5*i* and FIG. 5*k* illustrate cross-sectional side views of the board element 1 shown in FIG. 5*f* along the section A-A.

Figure 7A:
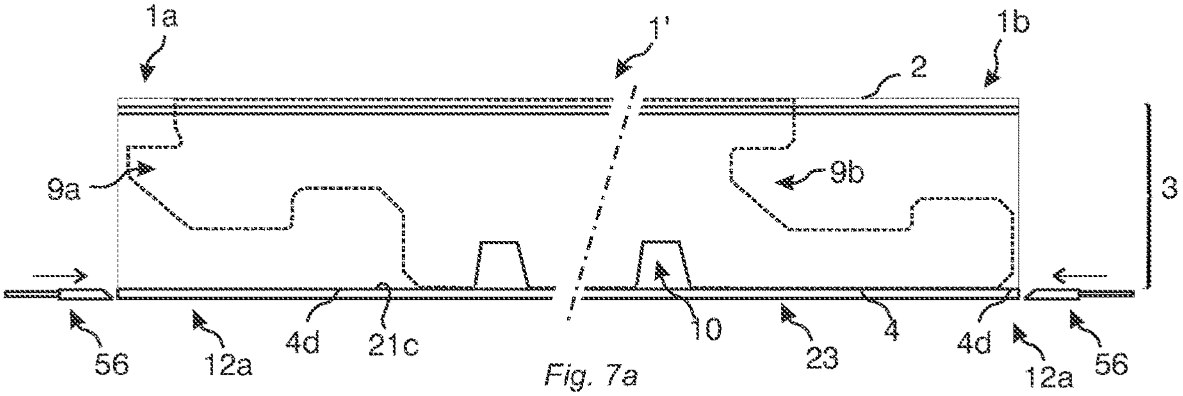
FIGS. 7*a*-7*c* illustrate in side views embodiments of a method for cutting an underlay element attached to a panel as well as an embodiment of a method for forming a locking system on the panel.
Figure 7B:
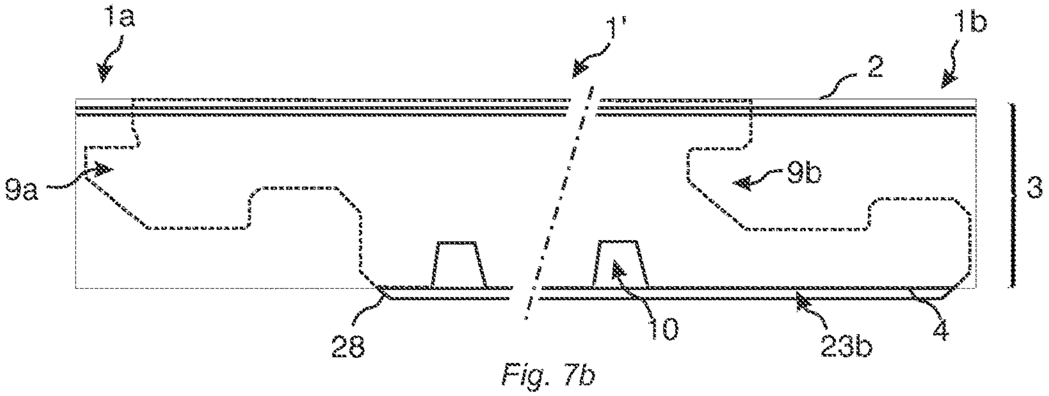

In a first example, the attached underlay element may be processed separately from the board element or panel (Box S20), such as illustrated in the embodiments in FIG. 5*g*-5*j* or 7*a*-7*c*. As shown in FIGS. 5*g*-5*h* and 7*a*-7*b*, the underlay element 23 or underlay unit 23*a* may be cut into at least one underlay unit 23*b* along at least one cutting portion 12*a*, preferably by a cutting tool 52 (Box S21). By way of example, the cutting tool 52 may be a rotating cutting device, a carving device or a knife arrangement. Thereby, material elements 23*c* may be removed from the underlay element. For example, a format of the cut underlay unit, such as a length along its first X and/or a second Y horizontal direction, may be adapted to a format of the panel, such as along its first and/or second horizontal direction. An inner portion of the underlay element may be cut as shown in FIGS. 5*g*-5*h* and/or an outer portion of the underlay element may be cut as shown in FIGS. 7*a*-7*b*. Optionally, at least one chamfer 28 may be formed, preferably after the underlay element has been arranged on the rear side.

Optionally, and as shown in FIG. 5*i*, the board element may be divided into at least one panel, such as at least two panels, 1' along at least one dividing portion 12*b* (Box S22), preferably by a dividing tool 54, for example comprising rotating cutting elements, such as a circular saw blade.

In a second example, and as illustrated in the embodiment in FIGS. 5*k*-5*l*, the dividing of the board element and the cutting of the attached underlay element may be performed jointly (Box S24), preferably by the same processing tool 56, which may comprise a cutting tool 52 and/or a dividing tool 54.

Figure 7C:
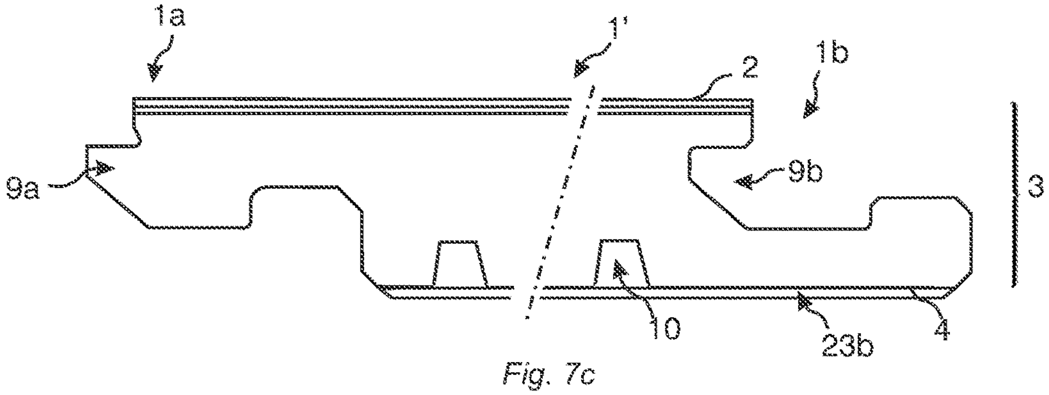

In some embodiments, no further processing of the panel or underlay element may be needed in e.g. FIG. 5*j*, 5*l* or 7*a*, which thereby may be in their final formats. For example, the panel may be adapted to be provided loosely on or glued to a subfloor. Optionally, however, and as shown in FIG. 7*c*, and also in FIG. 5*d*, a locking system 9, preferably a mechanical locking system, may be formed on at least one edge portion of the panel 1*a*, 1*b*, 1*c*, 1*d*, such as on all edge portions (Box S23) according to known principles in the art.

Optionally, the removed material elements 23*c*, 4*c*, such as chips, shavings or strips, from the underlay element and the board element during or after the cutting and dividing, may be separated from each other (Box S25). In some embodiments, also the material elements of the adhesive contacting the board element and/or underlay element may be separated. In a first example, the method comprises cutting the underlay element only and the thereafter dividing the board element. Thereby, the removed material elements may be easily separated, e.g. by separate vacuum devices. In a second example, the method comprises performing cutting and dividing in the same operation, the method optionally also comprising forming a locking system 9. The separation of the material elements may then be based on at least one attribute of the underlay element and the board element, and optionally the adhesive. The separation may be implemented by a separation device 37 in the system 30, which is illustrated schematically in FIG. 5*k*. The separation device 37 may be configured to screen or sieve the material elements or it may use gravity separation, such as specific gravity separation, of the material elements. For example, density separation or cyclonic separation may be utilized. In any of the first and second examples above, optionally, no, or substantially no, adhesive is applied in the cutting portion 12*a* and/or the dividing portion 12*b*.

In some embodiments, the removed material elements 23*c*, 4*c* from the underlay element and the board element during or after a forming of a locking system 9 on the board element, may be separated from each other. At least a portion of the locking system may be formed by removing material from a rear-side portion 4*d*, cf. FIG. 7*a*.

FIGS. 8*a*-8*f* and 9*a*-9*b* illustrate in bottom views embodiments of a panel 1' comprising an applied adhesive 20.

Generally, the adhesive in any of e.g. FIGS. 1*a*-1*c*, 2*a*-2*e*, 3*a*-3*e*, 5*b*, 5*f*, 8*a*-8*f* and 9*a*-9*b* may be applied continuously or intermittently on at least one portion of the board element 1 and/or underlay element 23 along the feeding path FP, FP', such as along the feeding direction FD, FD'. Thus, the applied adhesive may extend continuously or discontinuously along the first X and/or the second Y horizontal direction.

Figure 8A:
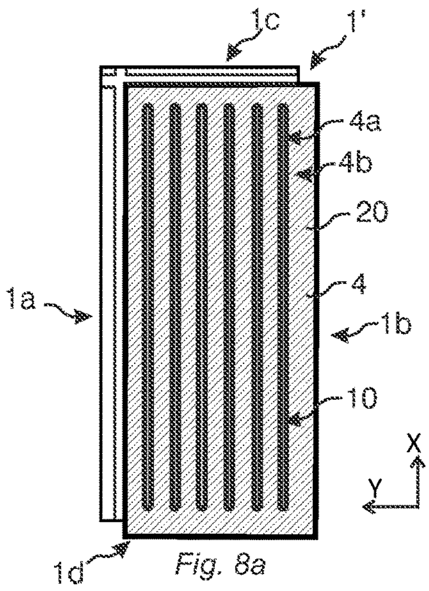
FIGS. 8*a*-8*f* illustrate in bottom views embodiments of a panel on which an adhesive has been applied.
Figure 8B:
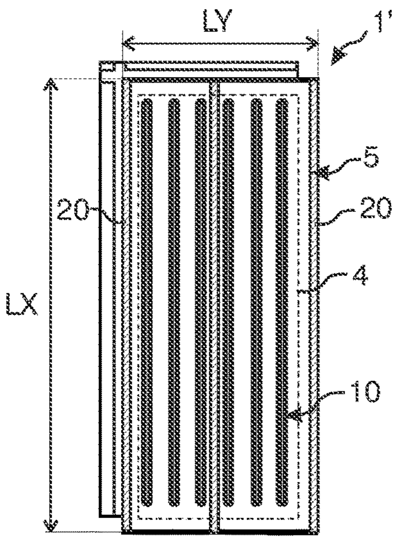
Figure 8C:
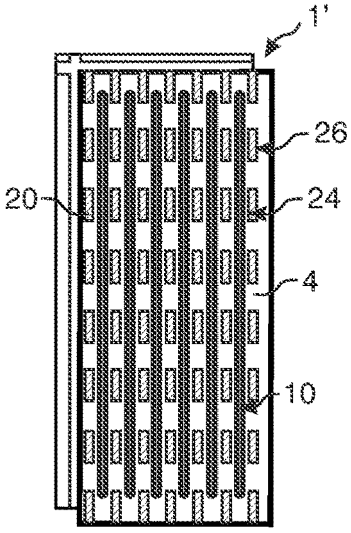
Figure 8D:
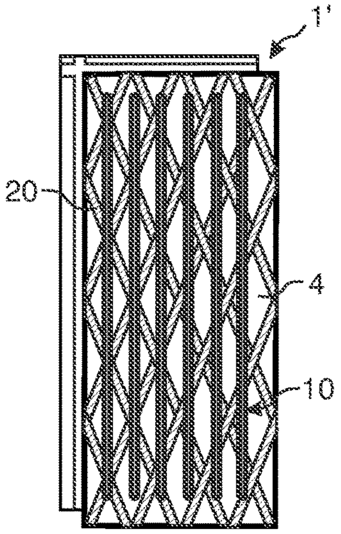
Figure 8E:
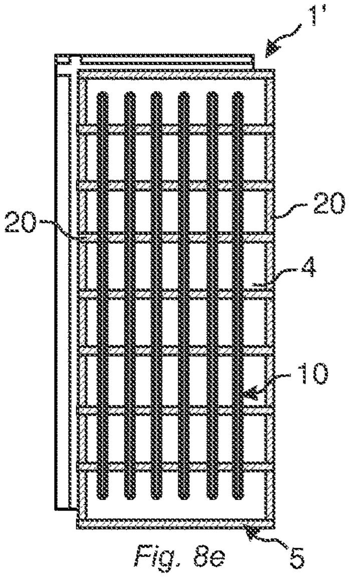
Figure 8F:
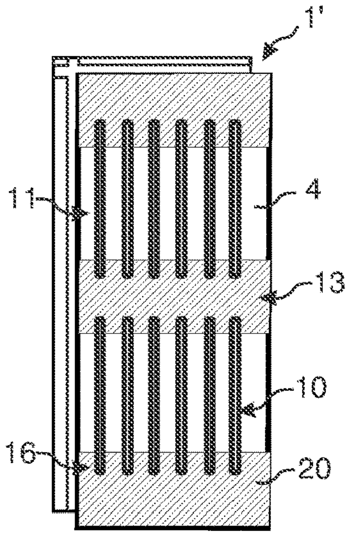
Figure 9A:
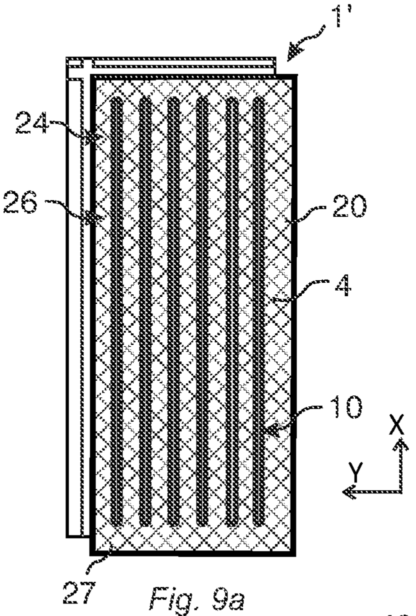
FIGS. 9*a*-9*f* illustrate embodiments of a panel on which an adhesive has been applied in bottom views and embodiments of an adhesive applicator in a top view and perspective views.

Any of the continuous or intermittent application of the adhesive disclosed herein may be a broad application as shown in, e.g., in the embodiments in FIGS. 5*f*, 8*a*, 8*e*-8*f* and 9*a*-*b* and/or a line application as shown in, e.g., in the embodiments in FIGS. 8b-8e and 9b. In FIGS. 8a, 8e-8f and 9a-9b, at least a portion of the adhesive 20 is applied over substantially the entire width of the remaining portion 4b along the second horizontal direction Y between long edge portions 1a, 1b. FIGS. 8a and 9a show embodiments wherein the adhesive is applied over substantially the entire remaining portion 4b. In FIG. 5f, the adhesive is applied as at least two, such as three, broad applications, which may be spaced from each other as described above. In FIGS. 8b-8f and 9b, the adhesive is applied over at least one portion of a width of the remaining portion 4b along the first X and/or the second Y horizontal direction, hence preferably between short edge portions 1c, 1d and/or between long edge portions 1a, 1b.

In FIGS. 8a-8f and 9a-9b, the adhesive 20 is applied in a peripheral portion 5 of the rear side 4. As illustrated in FIG. 8b by the broken lines, the peripheral portion 5, 5' of the rear side 4 or the upper side 21 may be located within a distance of 10%, preferably 5%, of a total length LX, LY of the board element or underlay element from a horizontally outermost portion of the rear side or the upper side. The adhesive may be applied along the long edge portions 1a, 1b and/or along the short edge portions 1c, 1d.

FIGS. 8a-8c, 8e-8f and 9b illustrate application, which may be line application or broad application, whereby the adhesive is applied along, i.e. in parallel with, the first X and/or the second Y horizontal direction. FIGS. 8d and 9a illustrate application, which may be line application and broad application, respectively, whereby the adhesive is applied at an angle with respect the first X and/or the second Y horizontal direction.

Figure 9B:
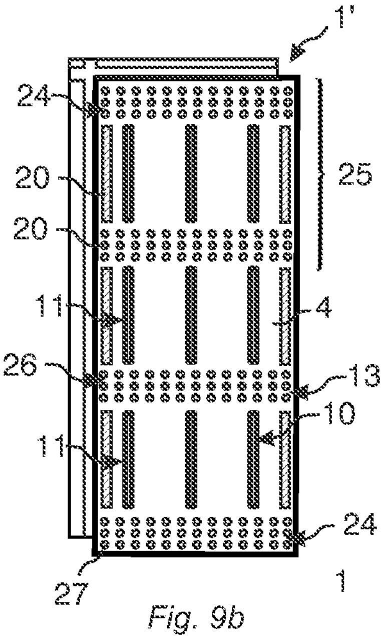

In any of the embodiments disclosed herein, such as illustrated in FIGS. 8c and 9a-9b, the adhesive 20 may be applied in a pattern arrangement 26 on the remaining portion 4b and/or on the corresponding residual portion 21b. The embodiment in FIG. 9a illustrates adhesive provided on the remaining portion 4b, wherein a basic application design 27 of the adhesive in the pattern arrangement 26 is provided in the form of a grid.

The pattern arrangement may be a primary pattern 24, such as in FIG. 8c or FIG. 9a. As illustrated in FIG. 9b, the pattern arrangement 26 may further comprise at least one further pattern, such as a secondary pattern 25. The secondary pattern may comprise at least two primary patterns 24 which may be spaced from each other, such as along the first X and/or second Y horizontal direction. In FIG. 9b the primary patterns 24 are spaced from each other along the first horizontal direction X. Optionally, additional adhesive 20 may be applied between the primary patterns, which for example may be applied by line application, such as in a peripheral portion 5, 5' as discussed above. A basic application design 27 of the adhesive in FIG. 9b is shaped as a circle. As shown in the embodiments in FIG. 9d, however, other basic application designs are equally conceivable, such as an oval, or a polygon, such as a triangle, a square or a star, etc.

Generally, and as shown in FIGS. 8f and 9b, the groove portion 4a may comprise at least two groove arrangements 11, each groove arrangement comprising at least one groove 10, preferably a plurality of grooves. The grooves may be discontinuously formed in the rear side 4 and their longitudinal extension may be parallel with the long edge portions 1a, 1b. An extension, such as a longitudinal extension, of the grooves in each groove arrangement, preferably are parallel to each other. The groove arrangements may be spaced from each other in the first X and/or second Y horizontal direction of the board element or panel. The groove arrangements may be spaced by a separation portion 13 provided in the rear side 4, preferably extending continuously along the second horizontal direction Y, such as between the long edge portions 1a, 1b. For example, the separation portion may comprise a rectangularly shaped portion.

As shown in FIG. 8f, the adhesive 20 may be applied, preferably controlled to be applied, between the groove arrangements 11, such as along the first horizontal direction X. The adhesive may be applied in the separation portion 13, for example covering the entire separation portion. Optionally, and as illustrated in FIG. 8f, the adhesive may also be applied between the grooves 10 of a groove arrangement 11, such as along the second horizontal direction Y. For example, the adhesive may be applied between end portions 16 of the grooves 10.

The adhesive 20, for example being provided in a primary pattern 24 as in FIG. 9b, may be applied between the groove arrangements 11, such as along the first horizontal direction X.

Generally, the pattern arrangement 26 may be applied by a contact application, such as by a slot-die coater 41 or by a roll coater 43, or by non-contact application, such as by a spray coater 45 or a curtain coater 46. The embodiments in, e.g., FIGS. 1a-1c, 2a-2e, 3a-3d and 5a-5l described elsewhere in the disclosure may be used for implementing the contact application or non-contact application.

Figure 9C:
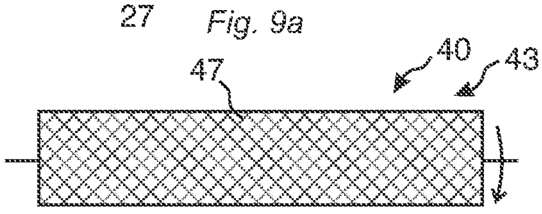
Figure 9D:
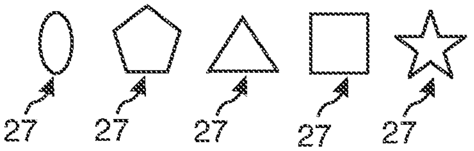
Figure 9E:
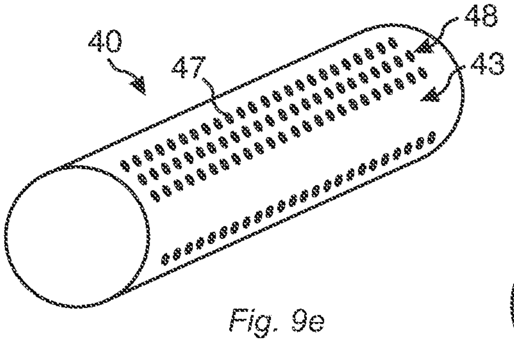

Additionally, the embodiments in FIGS. 9c and 9e illustrate in a top view and a perspective view an engraved roll coater 43 comprising a plurality of structural elements 47, such as indentations and/or protrusions. The structural elements of the roll coater in FIGS. 9c and 9e may correspond to the pattern arrangement 26 in FIG. 9a and the primary pattern 24 in FIG. 9b, respectively. The structural elements 47 in FIG. 9c are provided along the circumference of the roll coater while the structural elements 47 in FIG. 9e are arranged in groups 48, each group preferably being spaced from each other along the circumference of the roll coater. It is clear that the adhesive applicator 40 in FIG. 9c or 9e may be connected to an adhesive reservoir 42 as described elsewhere herein. Generally, the adhesive applicator may comprise at least one roll coater, whereby the roll coater in FIG. 9c or 9e may be an application roller 43a, cf. the embodiment in FIG. 2b.

The roll coater in FIGS. 9c and 9e may implement continuous or intermittent application of adhesive. Continuous application may be implemented as, e.g., in FIG. 2b. For example, the roll coater 43 and the transportation device 50 may be fixedly mounted, such as in the frame 32. Moreover, as illustrated in FIG. 2b by the dashed arrow, intermittent application may generally be implemented by bringing the roll coater 43 in and out of contact with the board element 1 and/or the underlay element 23 while displacing the same along a feeding path FP, FP'. In a first example, the roll coater 43 is displaceably mounted, such as in the frame 32. In a second example, the transportation device 50 is displaceably mounted, such as in the frame 32.

Figure 9F:
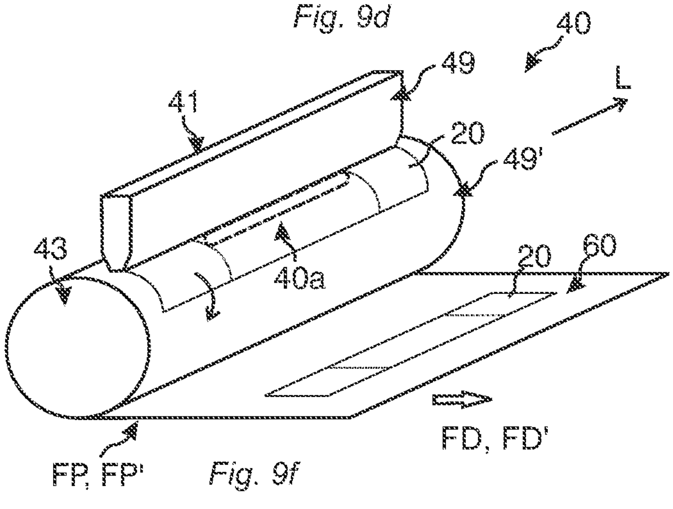

Generally, the adhesive may be applied by transfer application. The embodiment in FIG. 9f illustrates in a perspective view a part of an adhesive applicator 40 comprising an adhesive unit 49 in the form of a slot-die coater 41 and a transfer roller 49' capable of applying adhesive 20 intermittently and/or in a pattern arrangement 26 on a substrate 60, which may be transported along a feeding path FP, FP' in a feeding direction FD, FD'. As described above, the substrate 60 may be a board element 1, such as a panel 1', or an underlay element 23, such as an underlay unit 23a, 23b. The slot-die coater 41 may apply adhesive 20 on the roll coater 43 along the circumference and a longitudinal extension L thereof, such as intermittently and/or by applying the adhesive in a pattern arrangement and, preferably, during rotation of thereof. For example, the intermittent application of adhesive shown in, e.g., FIG. 8*f* and FIG. 10*b* described herein may be obtained by the adhesive applicator 40 in FIG. 9*f*. Moreover, the application of the adhesive shown in, e.g., FIGS. 8*b*, 8*e* and 10*e*-101 described herein may be obtained by the adhesive applicator 40 in FIG. 9*f*. In some embodiments, the adhesive coating on the substrate 60 in FIG. 9*f* may be discontinuous in the direction TD or TD'. For example, the slot-die coater may be used in conjunction with at least one mask 40*a*, which is indicated by broken lines in FIG. 9*f*.

Figure 10A:
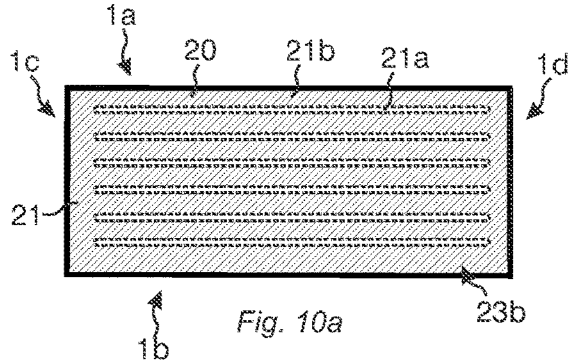
FIGS. 10*a*-10*d* illustrate in top views embodiments of an underlay element and in a bottom view an embodiment of a panel.
Figure 10B:
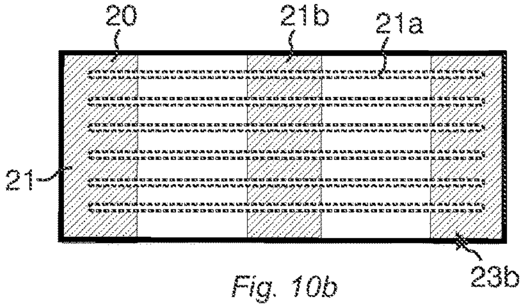

It is understood that the application of adhesive on the board element, e.g., as that described in relation to any of FIGS. 8*a*-8*f* and 9*a*-9*f*, describing broad application, line application, peripheral application, pattern arrangements, etc., is equally conceivable as an adhesive application on the corresponding residual portion 21*b* of an underlay element. Examples of such applications are illustrated in FIGS. 10*a*-10*b*, which illustrate embodiments of an underlay element 23*b* in top views. These applications are similar to the applications shown in FIG. 8*a* and FIG. 8*f*, respectively. Preferably, the adhesive 20 is not applied in the cover portion 21*a*. However, in some embodiments herein, a main portion, e.g., more than 50%, of the cover portion may be free from adhesive.

Figure 10C:
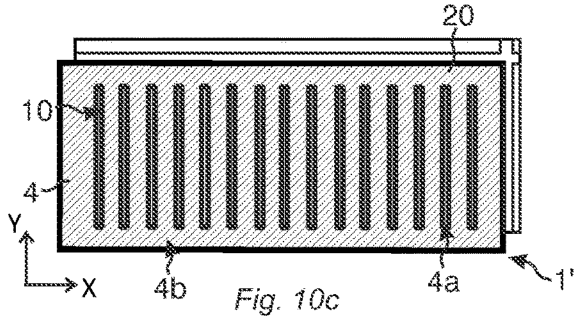
Figure 10D:
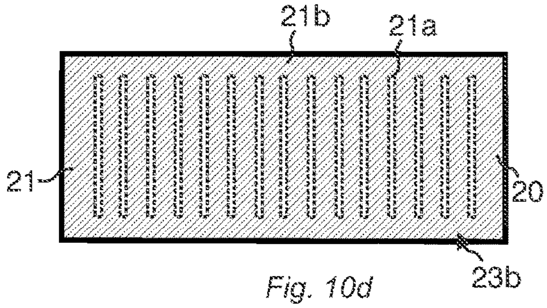

As shown in a bottom view in the embodiment in FIG. 10*c*, it is noted that in some embodiments a longitudinal extension of the grooves 10, may be parallel with the short edge portions 1*c*, 1*d*. The embodiment in FIG. 10*d* illustrates in a top view an underlay unit 23*b* configured to be attached to the panel 1' in FIG. 10*c*, wherein the cover portion 21*a* and the corresponding residual portion 21*b* are indicated. FIGS. 10*c* and 10*d* are shown with adhesive 20 applied over substantially the entire remaining portion 4*b* and/or corresponding residual portion 21*b*, respectively. Preferably, the adhesive is not applied in the groove portion 4*a* or the cover portion 21*a*.

Figure 9G:
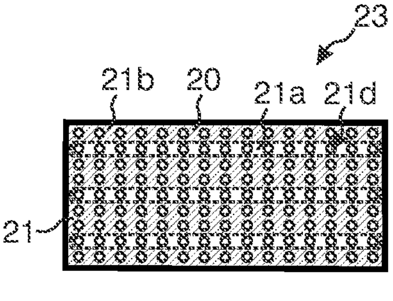
FIGS. 9*g*-9*h* illustrate in top views embodiments of an underlay element.
Figure 9H:
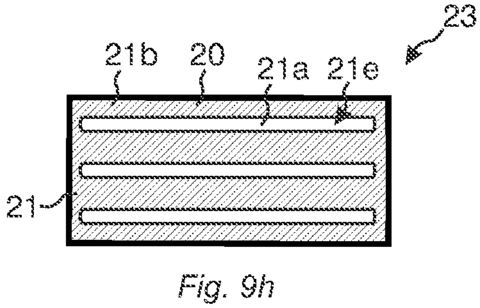

In some embodiments, as shown in FIGS. 9*g* and 9*h*, the underlay element 23, such as an underlay unit 23*a*, 23*b*, may be discontinuously formed, comprising perforations 21*d* and/or at least one hole 21*e* therein. The at least one hole 21*e* may be configured to align with groove portion 4*a* of the panel. Thereby, even less adhesive may be needed for the attachment. Other features may be similar to those described elsewhere herein, e.g., as in FIGS. 3*e*, 4*a*-4*f*, 5*a*-5*l*, 7*a*-7*d*, 8*a*-8*f*, 9*a*-9*b* and 10*a*-10*f*.

The method may comprise controlling the applying of the adhesive 20 such that no, or substantially no, adhesive is applied in the at least one cutting portion 12*a* and/or the at least one dividing portion 12*b*. Also, the method may comprise controlling the applying of the adhesive such that no, or substantially no, adhesive is applied in a rear-side portion 4*d* where a locking system 9 of at least one panel V is configured to be formed and/or in an upper-side portion 21*c* of the at least one underlay unit configured to contact the rear-side portion 4*d*. An example of such a rear-side portion 4*d* is shown in the embodiment in FIG. 7*a*.

Figure 10E:
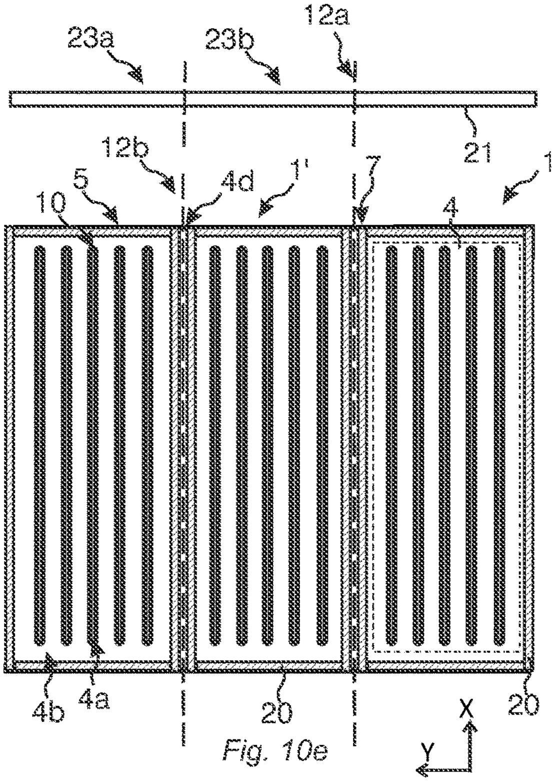
FIGS. 10*e*-10*f* illustrate embodiments of a board element and an underlay element in a bottom view and a top view, respectively, as well as in side views.
Figure 10F:
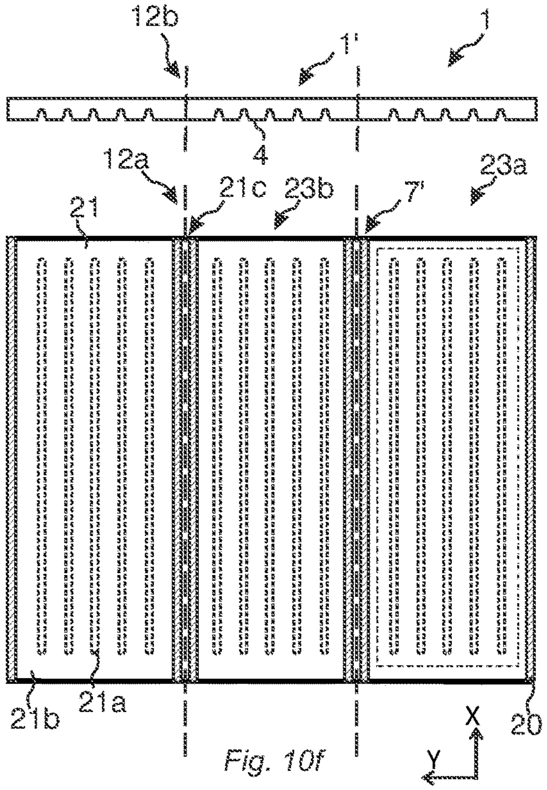

FIG. 10*e* illustrates an embodiment of a board element 1 comprising applied adhesive 20 in a bottom view and an underlay unit 23*a* in a side view. Moreover, FIG. 10*f* illustrates an embodiment of an underlay unit 23*b* comprising applied adhesive 20 in a top view and a board element 1 in a side view. In each of these embodiments, no, or substantially no, adhesive is applied in the at least one cutting portion 12*a* and/or the at least one dividing portion 12*b*. By way of example, the adhesive in FIG. 10*e* or 101 may be applied by a slot-die coater 41 or a spray coater 45 or even by an engraved roll coater 43. In each of FIGS. 10*e*-10*f*, the underlay unit 23*a* or underlay units 23*b* may be attached to the respective board element 1 or panels 1'.

As shown in FIG. 10*e*, the adhesive may be applied in peripheral portions 7 of at least two panels 1' into which the board element 1 is configured to be divided. Moreover, FIG. 10*f* illustrates that the adhesive may be applied in peripheral portions 7' of at least two underlay units 23*b* into which the underlay element 23*a* is configured to be cut. As indicated in FIGS. 10*e* and 10*f* for the rightmost panel V and underlay unit 23*b*, a peripheral portion 7, 7' may be delimited similarly as the peripheral portion 5, 5' described above. For example, in any of these embodiments, the adhesive may be applied in line application, such as extending along the first horizontal direction X, for example along long edge portions, of the panels V or underlay units 23*b*. Optionally, as shown in FIG. 10*e*, adhesive 20 may also be applied in line application, such as extending along the second horizontal direction Y, for example along short edge portions, of the panels 1' or underlay units 23*b*, preferably, no, or substantially no, adhesive being applied in the at least one cutting 12*a* and/or dividing 12*b* portion. The adhesive is preferably applied in a peripheral portion 5, 5'.

Generally, the adhesive may be controlled to be applied on the remaining portion 4*b* and/or the residual portion 21*b* only. The method may comprise the act of controlling the applying of the adhesive 20 based on a characteristic of the at least one groove 10. For example, the control unit 44 may control the application. The adhesive may be applied by spraying, curtain coating, slot-die coating or roller coating. The characteristic may be at least one selected from the group of a shape, an extension, a position of the at least one groove 10 or the at least one groove arrangement 11 in the first X and/or the second Y horizontal direction, and a distance between at least one pair of grooves or a pair of groove arrangements in the first and/or the second horizontal direction. The controlling may comprise controlling a positioning of the adhesive on the board element and/or the underlay element and, optionally, an amount of the adhesive.

In any embodiment described herein, and as schematically illustrated in FIGS. 1*a*-1*b*, data about the characteristics may be retrieved by the control unit 44 from a data storage unit 57, which may store predetermined data and/or collected data. For simplicity, the data storage unit 57 will often be suppressed in the figures. For example, the data may be obtained or collected by scanning the rear side 4 by a scanner 58, preferably being connected to the data storage unit 57. The scanner 58 may comprise a horizontal 58*a* and/or a vertical 58*b* scanning unit configured to determine data about the groove(s) along at least one direction X, Y, Z, such as along at least one horizontal direction X, Y and/or along a vertical direction Z. The scanning device 58 may comprise an image sensor, such as a digital camera, and/or a laser triangulation device. For example, the scanner 58, optionally comprising a horizontal 58*a* and/or a vertical 58*b* scanning unit, may be provided in a vision inspection system.

In some embodiments, data about the characteristics, which may be predetermined data and/or collected data, may determine a position of the adhesive applier 40, such as the roll coater 43 or the slot-die coater 41, with respect to the board element 1 and/or the underlay element 23.

The adhesive 20 may be controlled to be applied between at least one groove arrangement 11 and/or discontinuous grooves 10, such as in FIG. 9*b*.

Generally, the adhesive 20 may be post-treated by a post-treatment device 34, such as a drying device and/or a radiation device explained above. Alternatively, or additionally, the method may further comprise post-heating the adhesive by a post-heating device 36 and/or exposing the adhesive to moisture by a moisture regulator 39.

The method may further comprise applying pressure on the adhesive 20, preferably during curing or hardening of the adhesive. For example, a pressure device 35 such as those described in relation to FIGS. 1*a* and 3*d* may be used.

In some embodiments, the adhesive 20 may be pre-applied on the underlay element 23. For example, the underlay element may be delivered to the system 30 with a pre-applied adhesive. In such embodiments, such as in any of those in FIGS. 1*a*-1*c*, 2*d*, 3*d*, 4*a*-4*f*, 5*a*-5*l*, 7*a*-7*c*, the adhesive applier 40 applicator may become redundant, but other features may be the same. It is noted, however, that the pre-applied adhesive 20 may be embodied as in any of the embodiments described herein describing adhesive application on a board element 1, 1' or an underlay element 23, 23*a*, 23*b*, such as in FIGS. 8*a*-8*f* and 9*a*-9*b*, 9*d*, 10*a*-10*f*. For example, the adhesive may be applied in a line application, a broad application, a pattern arrangement 26, etc.

Figure 7D:
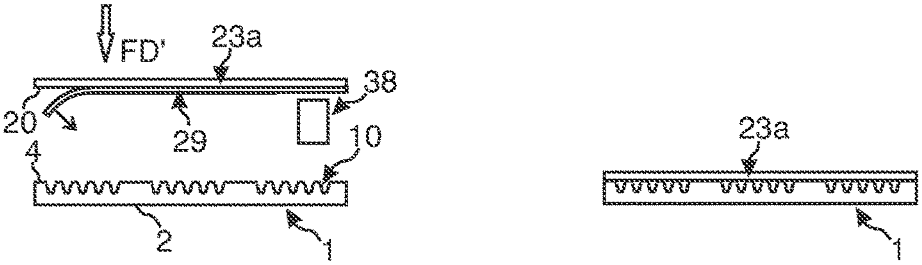
FIG. 7*d* illustrates in a side view an embodiment of an arrangement of an underlay element on a board element, wherein the underlay element comprises a pre-applied adhesive and is provided with a release liner.

As shown schematically in FIG. 7*d*, the underlay element with pre-applied adhesive may be provided with a release liner 29, such as a release film. The release liner may be removed before arranging the underlay element on the rear side 4, such as by a liner-removal device 38 provided in the system 30. In some embodiments, the release liner 29 may be removed in a continuous process, such as when the board element and/or the underlay element is fed along a feeding path FP, FP', such as along a feeding direction FD, FD'.

Figure 3E:
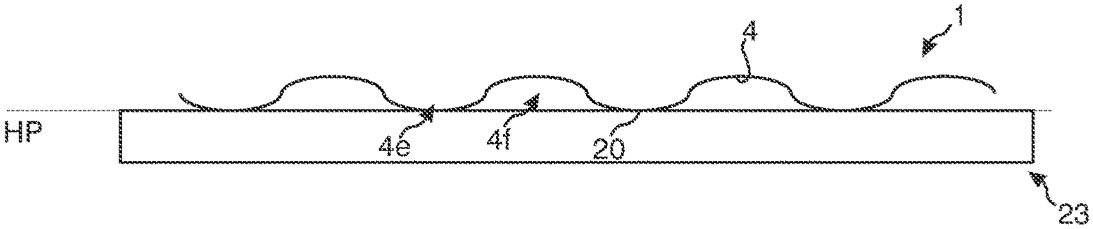
FIG. 3*e* illustrates in a side view a zoomed-in section around a rear side of a board element comprising a surface roughness.

The embodiment in FIG. 3*e* illustrates that the remaining portion 4*b* in any embodiment herein, such as in any of FIGS. 1*a*-1*c*, 2*a*-2*e*, 3*a*-3*d*, 4*a*-4*f*, 5*a*-5*l*, 7*a*-7*d*, 8*a*-8*f*, 9*a*-9*b*, 10*c* and 10*e*-10*f*, may comprise a surface roughness, e.g. comprising peaks 4*e* and valleys 4*f*. For example, the surface roughness may be provided by an embossing of the rear side 4. The peaks may be provided in the horizontal plane HP. The adhesive 20 attaching the underlay element 23 to the board element 1 may be provided on the peaks 4*e*, preferably such that no, or substantially no, adhesive is applied in the valleys 4*f*.

The inventive concept has mainly been described above with reference to a few embodiments. However, as is readily appreciated by a person skilled in the art, other embodiments than the ones disclosed above are equally possible within the scope of the inventive concept, as defined by the appended patent claims and items in an embodiment section below. For instance, it is clear that the board element or panel in any of the embodiments in e.g. FIGS. 1*a*-1*c*, 2*a*-2*e*, 3*c*-3*e*, 4*a*-4*b*, 5*a*-5*l*, 7*a*-7*d*, 8*a*-8*f* and 9*a*-9*b* may comprise a layer arrangement 3 comprising at least one layer 3*a*, 3*b*, 3*c* in analogy with the discussion in relation to the embodiments in FIGS. 4*a*-4*f*. The at least one layer in the layer arrangement 3 may each comprise a polymer-based material, such as a thermoplastic material or a thermoset, and, preferably, a filler. Moreover, it is clear that any of the systems described herein, such as any of those in FIGS. 1*a*-1*c*, 2*a*-2*e*, 3*a*-3*d*, 5*a*-5*l*, 7*a*-7*c* and 9*c*-9*f* may comprise a post-treatment device 34, such as drying device, radiation device, or a moisture regulator 39, or a post-heating device 36. Optionally, the system may comprise a separation device 37. Finally, and as noted above, it is clear that in some embodiments the panel 1', such as that in any of e.g. FIGS. 1*a*-1*c*, 2*b*-2*d*, 3*c*-3*e*, 4*a*-4*b*, 5*a*-5*l*, 7*a*-7*c*, 8*a*-8*f*, 9*a*-9*b*, 10*c* and 10*e*-10*f*, may instead be a building panel, wall panel, ceiling panel or furniture panel. Clearly, however, the panel 1' in these embodiments may comprise a different locking system than that displayed in the figures or it may even be lacking a locking system.

Example 1

A layer of 20 g/m$^2$ reactive PUR hot-melt Coating P. Materials PR-6620 was applied with a roll coater on the rear side of an SPC panel provided with a plurality of grooves. An EVA foam was arranged on the rear side of the panel such that the hot adhesive contacted the foam and the rear side. The panel was thereafter pressed in a calender press. A line-speed was set to 30 m/min and a calender pressure was set to 3 Bar. The adhesive was applied at an application temperature of 110° C., an ambient temperature of 25° C., and an RH value of 55%.

Example 2

A layer of 20 g/m$^2$ reactive PUR hot-melt KLEIBERIT 711.2.00 was applied with a spray coater on the rear side of an LVT tile provided with a plurality of grooves. An IXPE foam was arranged on the rear side of the tile such that the hot adhesive contacted the foam and the rear side. The tile was thereafter pressed in a calender press. A line-speed was set to 15 m/min and a calender pressure was set to 3 Bar. The adhesive was applied intermittently in a pattern arrangement at an application temperature of 120° C., an ambient temperature of 25° C., and an RH value of 55%.

Embodiments

Further aspects of the inventive concept are provided below. Embodiments, examples etc. of these aspects are largely analogous to the embodiments, examples, etc. as described above, whereby reference is made to the above for a detailed description.

Item 1. A method for attaching an underlay element (23), such as an underlay unit (23*a*; 23*b*), to a board element (1), such as a panel (1'), comprising:

- providing a board element, wherein a rear side (4) of the board element comprises a groove portion (4*a*) and a remaining portion (4*b*), said groove portion comprising at least one groove (10),
- providing the underlay element (23),
- applying an adhesive (20) on at least a portion of said remaining portion (4*b*) and/or on at least a portion of a corresponding residual portion (21*b*) of the underlay element, and
- arranging the underlay element on the rear side of the board element, such that the adhesive contacts the underlay element and the rear side.

Item 2. The method according to item 1, wherein the adhesive is applied during a displacement of the board element and/or the underlay element along a feeding path (FP; FP').

Item 3. The method according to item 1 or 2, wherein said arranging of the underlay element on the rear side is performed during a displacement of the board element and/or the underlay element in along a feeding path (FP; FP').

Item 4. The method according to any of the preceding items, wherein the adhesive is applied at least on a peripheral portion (5) of the rear side and/or on a peripheral portion (5') of an upper side of the underlay element, any or both of said peripheral portions preferably extending along a short edge portion (1*c*, 1*d*) and/or a long edge portion (1*a*, 1*b*) of the board element and/or the underlay element.

Item 5. The method according to item 4, wherein the peripheral portion of a board element comprises a peripheral portion (7) of at least one panel, such as at least two panels, into which the board element is configured to be divided and/or wherein the peripheral portion of an underlay element comprises a peripheral portion (7') of at least one underlay unit, such as two underlay units, into which the underlay element is configured to be cut.

Item 6. The method according to any of the preceding items, wherein the method further comprises controlling said applying of the adhesive based on a characteristic of the at least one groove, wherein the controlling preferably results in adhesive being selectively applied, such as on the remaining portion and/or the corresponding residual portion.

Item 7. The method according to item 6, further comprising retrieving data about the characteristics of the at least one groove for controlling said applying of the adhesive.

Item 8. The method according to any of the preceding items, wherein the adhesive is applied by contact application, such as by slot-die coating or by roller coating and/or wherein the adhesive is applied by non-contact application, such as by spraying or curtain coating.

Item 9. The method according to any of the preceding items, wherein the adhesive is applied continuously or intermittently, such as along a feeding path (FP; FP') of the board element and/or the underlay element.

Item 10. The method according to any of the preceding items, wherein the adhesive is applied in a pattern arrangement (26).

Item 11. The method according to any of the preceding items, wherein said remaining portion has a larger thickness (Tb) than a thickness (Ta) of said groove portion, a main portion of the remaining portion preferably having a constant thickness.

Item 12. The method according to any of the preceding items, wherein at least two grooves have been discontinuously formed, and wherein said applying of the adhesive comprises applying the adhesive between the discontinuous grooves, such as along a first (X) and/or a second (Y) horizontal direction of the board element.

Item 13. The method according to any of the preceding items, wherein the board element comprises at least one layer (3*a*, 3*b*, 3*c*) and wherein the at least one groove at least partly penetrates the at least one layer, such as at least a bottom layer (3*c*).

Item 14. The method according to item 13, wherein said at least one layer, optionally comprising a top layer (3*a*) and/or a bottom layer (3*c*), each comprises a polymer-based material, preferably a thermoplastic material or a thermoset, and, preferably, a filler.

Item 15. The method according to any of the preceding items, further comprising:

cutting said underlay element (23) into at least one underlay unit (23*a*; 23*b*) along at least one cutting portion (12*a*).

Item 16. The method according to any of the preceding items, further comprising:

dividing said board element (1) into at least one panel (V), such as at least two panels, along at least one dividing portion (12*b*).

Item 17. The method according to item 16, wherein the board element is divided after said act of arranging the underlay element on the rear side.

Item 18. The method according to any of the preceding items, further comprising controlling the applying of the adhesive such that no, or substantially no, adhesive is applied on a rear-side portion (4*d*) of the board element and/or an upper-side portion (21*c*) of the underlay element configured to be further processed, such as by cutting, dividing or forming of a locking system.

Item 19. The method according to any of the preceding items, further comprising controlling said applying of the adhesive such that no, or substantially no, adhesive is applied in at least one cutting portion (12*a*) and/or at least one dividing portion (12*b*).

Item 20. The method according to any of the preceding items, further comprising controlling said applying of the adhesive such that no, or substantially no, adhesive is applied:

in a rear-side portion (4*d*) of where a locking system (9), such as of at least one panel (V), is configured to be formed, and/or in an upper-side portion (21*c*) of the at least one underlay unit (23*a*; 23*b*) configured to be provided along, such as to contact, said rear-side portion (4*d*).

Item 21. The method according to any of the preceding items, further comprising separating material elements (23*c*; 4*c*), such as chips, shavings or strips, removed from the underlay element and the board element during or after processing of the board element and the underlay element, such as by separating the material elements based on at least one attribute of the underlay element and the board element, respectively.

Item 22. The method according to item 21, wherein said processing comprises cutting said underlay element (23) into at least one underlay unit (23*a*; 23*b*) and dividing said board element into at least one panel and/or forming a locking system (9) on the board element.

Item 23. The method according to any of the preceding items, wherein the adhesive is a hot-melt adhesive.

Item 24. The method according to any of the preceding items, further comprising drying the adhesive and/or exposing the adhesive to radiation, such as infrared or ultraviolet radiation.

Item 25. The method according to any of the preceding items, further comprising post-heating the adhesive, i.e., heating the adhesive at or after its application on the rear side.

Item 26. The method according to any of the preceding items, further comprising applying pressure on the underlay element and/or the board element, preferably during curing or hardening of the adhesive.

Item 27. The method according to any of the preceding items, wherein the underlay element is a foam, such as a closed-cell foam, for example an IXPE foam, an IXPP foam, an EVA foam, an XLPO foam, an XLPE foam, a foam rubber or a PU, PO, PE or PS foam, or wherein the underlay element is a cork sheet.

Item 28. The method according to any of the preceding items, wherein the board element is a panel (1') and wherein the method further comprises forming a locking system (9) for horizontal and/or vertical locking, preferably a mechanical locking system, on at least one edge portion of said panel, preferably on all edge portions (1*a*, 1*b*; 1*c*, 1*d*).

Item 29. The method according to any of the preceding items, wherein the panel is a floor panel or a wall panel.

Item 30. Board element (1), such as a panel (1'), obtainable by the method according to any of the preceding items 1-29.

Item 31. A system (30) for attaching an underlay element (23), such as an underlay unit (23*a*; 23*b*), to a board element (1), such as a panel (V), comprising:

an adhesive applicator (40), and an underlay applier (31).

Item 32. Panel assembly comprising a panel (1') and an underlay unit (23*b*), wherein a rear side (4) of the panel comprises a groove portion (4*a*) and a remaining portion (4*b*), said groove portion comprising at least one groove (10), and wherein the underlay unit (23*b*) is attached to the rear side of the panel by an adhesive (20) contacting at least a portion of said remaining portion and a corresponding residual portion (21*b*) of the underlay unit.

Item 33. The panel assembly according to item 32, wherein said remaining portion has a larger thickness (Tb) than a thickness (Ta) of said groove portion, a main portion of the remaining portion preferably having a constant thickness.

Item 34. The panel assembly according to item 32 or 33, wherein the adhesive is applied in a pattern arrangement (26).

Item 35. The panel assembly according to any of the preceding items 32-34, wherein at least two grooves have been discontinuously formed, and wherein the adhesive is provided between the discontinuous grooves, such as along a first (X) and/or a second (Y) horizontal direction of the panel.

Item 36. The panel assembly according to any of the preceding items 32-35, wherein the panel comprises at least one layer (3*a*, 3*b*, 3*c*) and wherein the at least one groove at least partly penetrates the at least one layer, such as at least a bottom layer (3*c*).

Item 37. The panel assembly according to item 36, wherein said at least one layer, optionally comprising a top layer (3*a*) and/or a bottom layer (3*c*), each comprises a polymer-based material, such as a thermoplastic material, and, preferably, a filler.

Item 38. A method for attaching an underlay element (23), such as an underlay unit (23*a*; 23*b*), to a board element (1), such as a panel (1'), comprising:

providing a board element, wherein a rear side (4) of the board element comprises a groove portion (4*a*) and a remaining portion (4*b*), said groove portion comprising at least one groove (10), providing an underlay element (23) comprising a pre-applied adhesive (20), and arranging the underlay element on the rear side of the board element, such that the adhesive contacts the underlay element and the rear side.

Item 39. The method according to item 38, wherein the adhesive (20) is applied on at least a portion of a corresponding residual portion (21*b*) of the underlay element, such as on the corresponding residual portion only.

Item 40. The method according to item 38 or 39, further comprising synchronizing a position of the underlay element with a position of the board element, such that the underlay element becomes aligned with the board element, preferably such that a cover portion (21*a*) is aligned with the groove portion and a corresponding residual portion (21*b*) is aligned with the remaining portion.

Item 41. The method according to any of the preceding items 38 to 40, wherein the underlay element is provided with a release liner (29), such as a release film, and wherein the method further comprises removing the release liner before arranging the underlay element on the rear side.

Item 42. The method according to any of the preceding items 38 to 41, wherein no, or substantially no, pre-applied adhesive is applied on an upper-side portion (21*c*) of the underlay element configured to be further processed, such as by cutting or forming of a locking system.

Item 43. The method according to any of the preceding items 38 to 42, wherein no, or substantially no, pre-applied adhesive is applied in at least one cutting portion (12*a*).

Item 44. The method according to any of the preceding items 38 to 43, wherein no, or substantially no, pre-applied adhesive is applied in an upper-side portion (21*c*) of the at least one underlay unit (23*a*; 23*b*) configured to be provided along, such as to contact, a rear-side portion (4*d*) where a locking system (9), such as of at least one panel (V), is configured to be formed.

Item 45. The method according to any of the preceding items 38 to 44, and further according to any of the preceding items 3-5, 10-17, 21-29.

The invention claimed is:

1. A method for attaching an underlay element to a weight-reduced board element comprising a plurality of grooves, the board element being a panel per se or the board element being dividable into at least one panel, wherein the at least one panel is a floor panel or a wall panel, the method comprising:

providing the board element, wherein a rear side of the board element comprises a groove portion and a remaining portion, said groove portion comprising said plurality of grooves, and said remaining portion being provided in a horizontal plane (HP) extending along the rear side of the board element, wherein said remaining portion is located on a periphery of the groove portion, each of said plurality of grooves being a recess formed from an essentially planar surface on the rear side of the board element, providing the underlay element, the underlay element being a foam or a cork sheet, wherein an upper side of the underlay element comprises a cover portion and a corresponding residual portion, which are configured to face and to be aligned with the groove portion and the remaining portion, respectively, when the underlay element is attached to the rear side, applying an adhesive on at least a portion of said remaining portion and/or on at least a portion of the corresponding residual portion of the underlay element, such that the plurality of grooves is free of adhesive during application and the adhesive fully circumscribes the groove portion, and arranging the underlay element on the rear side of the board element, such that the adhesive contacts the underlay element and the rear side, including between the remaining portion and the corresponding residual portion of the underlay element, wherein the board element comprises at least one layer, said at least one layer comprising a thermoplastic material, and wherein the plurality of grooves at least partly penetrates the at least one layer, and wherein the adhesive is applied at least on a peripheral portion of the rear side of the board element and/or on a peripheral portion of the upper side of the underlay element, wherein the applying of the adhesive is performed on at most 95% of said remaining portion and/or of the corresponding residual portion of the underlay element.

2. The method according to claim 1, wherein the method further comprises controlling said applying of the adhesive based on a characteristic of the plurality of grooves, wherein said controlling is based on data about the characteristic of the plurality of grooves.

3. The method according to claim 2, wherein the characteristic is a shape of the plurality of grooves and/or an extension of the plurality of grooves in a first (X) and/or a second (Y) horizontal direction of the board element.

4. The method according to claim 2, wherein the characteristic is:

a position of the plurality of grooves in the rear side and/or a distance between at least one pair of grooves of the plurality of grooves in the first (X) and/or the second (Y) horizontal direction, or a distance between at least one pair of groove arrangements in the first (X) and/or the second (Y) horizontal direction, each groove arrangement comprising at least one groove of the plurality of grooves.

5. The method according to claim 1, wherein the method further comprises controlling said applying of the adhesive based on a characteristic of the plurality of grooves, and retrieving data about the characteristic of the plurality of grooves for controlling said applying of the adhesive.

6. The method according to claim 5, wherein said data is obtained by scanning the rear side of the board element by a scanner.

7. The method according to claim 6, wherein a position of the adhesive applied during the applying is based on the retrieved data.

8. The method according to claim 1, wherein the peripheral portion of the rear side of the board element comprises a peripheral portion of the at least one floor or wall panel, into which the board element is configured to be divided and/or wherein the peripheral portion of the upper side of the underlay element comprises a peripheral portion of at least one underlay unit, into which the underlay element is configured to be cut.

9. The method according to claim 1, wherein the adhesive is applied in a pattern arrangement.

10. The method according to claim 1, wherein at least two grooves of the plurality of grooves are discontinuous grooves which have been discontinuously formed, and wherein said applying of the adhesive comprises:

applying the adhesive between the discontinuous grooves, and/or applying the adhesive between corresponding cover portions of the underlay element.

11. The method according to claim 1, further comprising:

cutting said underlay element into at least one underlay unit along at least one cutting portion, and/or dividing said board element into the at least one floor or wall panel, along at least one dividing portion.

12. The method according to claim 1, further comprising controlling the applying of the adhesive such that no, or substantially no, adhesive is applied on a rear-side portion of the board element and/or an upper-side portion of the underlay element configured to be further processed.

13. The method according to claim 1, further comprising controlling said applying of the adhesive such that no, or substantially no, adhesive is applied in at least one cutting portion and/or at least one dividing portion.

14. The method according to claim 1, further comprising controlling said applying of the adhesive such that no, or substantially no, adhesive is applied:

in a rear-side portion where a locking system, is configured to be formed, and/or in an upper-side portion of the at least one underlay unit configured to be provided along said rear-side portion.

15. The method according to claim 1, further comprising separating material elements removed from the underlay element and the board element during or after processing of the board element and the underlay elements.

16. The method according to claim 1, is applied by roller coating.

17. The method according to claim 1, wherein the adhesive substantially covers an entire extent of the rear side of the board element between the plurality of grooves.

18. The method according to claim 1, wherein the essentially planar surface on the rear side of the board element includes a surface roughness.

19. The method according to claim 1, wherein the essentially planar surface on the rear side of the board element is smooth.

20. The method according to claim 1, wherein the peripheral portion of the rear side comprises the essentially planar surface.

* * * * *